US006940975B1

(12) United States Patent
Kawamura et al.

(10) Patent No.: US 6,940,975 B1
(45) Date of Patent: Sep. 6, 2005

(54) ENCRYPTION/DECRYPTION APPARATUS, ENCRYPTION/DECRYPTION METHOD, AND PROGRAM STORAGE MEDIUM THEREFOR

(75) Inventors: Shinichi Kawamura, Kodaira (JP); Fumihiko Sano, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/377,064

(22) Filed: Aug. 19, 1999

(30) Foreign Application Priority Data

Aug. 20, 1998 (JP) ................................. 10-233921

(51) Int. Cl.[7] .............................. H04L 9/14; H04K 1/00
(52) U.S. Cl. .......................................... 380/37; 380/29
(58) Field of Search .............................. 380/37, 28, 42, 380/43, 29, 285

(56) References Cited

U.S. PATENT DOCUMENTS

| 3,962,539 A |   | 6/1976 | Ehrsam et al. |
|---|---|---|---|
| 5,323,464 A | * | 6/1994 | Elander et al. ............. 713/191 |
| 5,682,395 A | * | 10/1997 | Begin et al. ................. 714/793 |
| 5,870,470 A | * | 2/1999 | Johnson et al. ............. 380/285 |
| 6,031,911 A | * | 2/2000 | Adams et al. ................ 380/29 |

FOREIGN PATENT DOCUMENTS

| JP | 10-154976 | 6/1998 |
|---|---|---|
| WO | WO 9948239 | 9/1999 |

OTHER PUBLICATIONS

Kocher, P.C., "Timing Attacks on Implementations of Diffie-Hellman, RSA, DSS, and Other Systems", Springer-Verlag, pp. 104-113, (1998).

Anderson, R. et al., "Tamper Resistance—a Cautionary Note", The Second USENIX Workshop on Electronic Commerce Proceedings, pp. 1-11 (1996).

Kocher, P. et al., "Introduction to Differential Power Analysis and Related Attacks", Cryptography Research, Inc., pp. 1-7 (1998).

D. Coppersmith et al., *A Proposed Mode for Triple-DES Encryption*, IBM J. RES Develop, vol. 40, No. 2, Mar. 1996, p. 253.

P. Kocher, *Timing Attacks on Implementations of Diffie-Hellman, RSA, DSS, and Other Systems*, XP 000626590, Aug. 18, 1996, Stanford, CA.

Japanese Patent Office Action dated Mar. 30, 2004 in Japanese Patent Appl. No. 1998-233921 (an English language translation of the Japanese Patent Office Action is enclosed).

* cited by examiner

*Primary Examiner*—Matthew Smithers
(74) *Attorney, Agent, or Firm*—Finnegan, Henderson, Farabow, Garrett & Dunner, L.L.P.

(57) ABSTRACT

A pair of a pattern of a mask and a mask pattern obtained by bit inversion of the mask is prepared for each round function in a data scrambler. Every time encryption is to be performed, one mask pattern of the pair is randomly selected by a switch, and an exclusive OR of an input to an S-box and the selected mask pattern is calculated. In addition, an exclusive OR of an output from the S-box and bits of inverse permutation of the mask is calculated. The exclusive ORs are calculated in advance and stored as a table in the S-box. Furthermore, an exclusive OR of the output from each round function and a mask is calculated and concealed. The influence of the mask is removed by calculating the exclusive OR with the mask again on the next round.

49 Claims, 13 Drawing Sheets

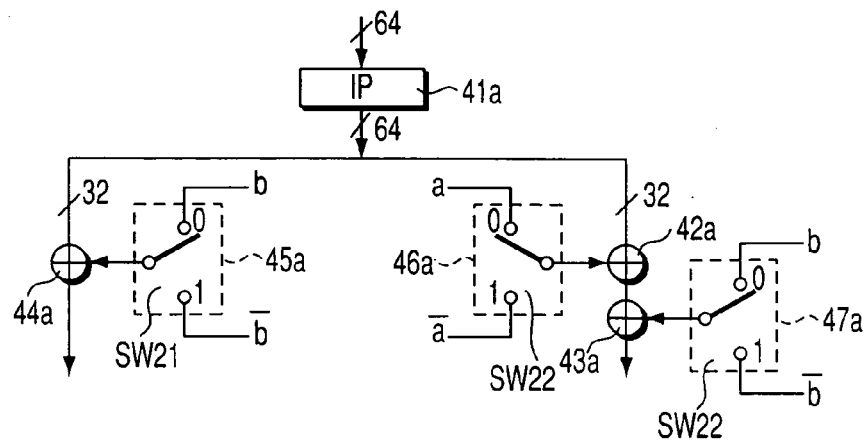
FIG. 5A
FIG. 5B
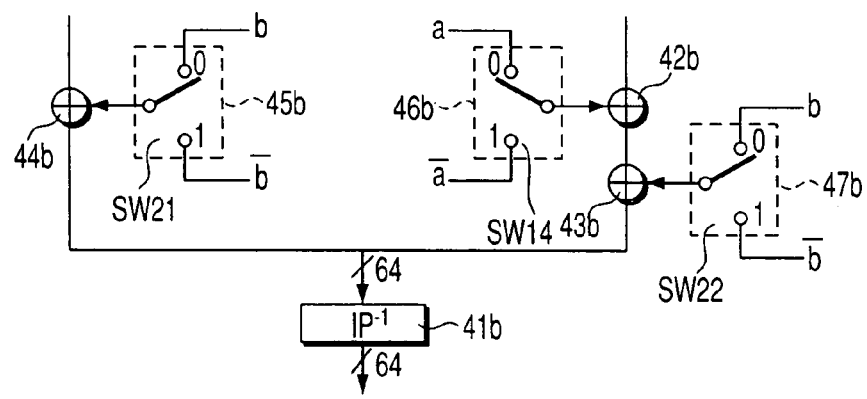
TABLE OF EXPANSION E
FIG. 6
| 32, | 1, | 2, | 3, | 4, | 5, |
| 4, | 5, | 6, | 7, | 8, | 9, |
| 8, | 9, | 10, | 11, | 12, | 13, |
| 12, | 13, | 14, | 15, | 16, | 17, |
| 16, | 17, | 18, | 19, | 20, | 21, |
| 20, | 21, | 22, | 23, | 24, | 25, |
| 24, | 25, | 26, | 27, | 28, | 29, |
| 28, | 29, | 30, | 31, | 32, | 1, |
TABLE OF PERMUTATION P
FIG. 7
16, 7, 20, 21, 29, 12, 28, 17, 1, 15, 23, 26, 5, 18, 31, 10,
2, 8, 24, 14, 32, 27, 3, 9, 19, 13, 30, 6, 22, 11, 4, 25, OUTPUT OF CONCEALED S1 WHEN INPUT CORRESPONDS
TO (000000, 000001,···,111111) IN CASE OF MASK a

```
8 11 14 2 13 4 0 15 1 7 11 1 6 13 5 8 15 12 4 9 3 10 9
3 10 0 7 14 12 6 2 5 4 2 8 1 7 11 11 16 14 4 13 8 9 7 6
13 10 9 1 14 0 12 12 0 5 15 2 5 3 10 15 3
```

TABLE OF MASK ā (BIT INVERSION OF a)

```
12 0 5 12 10 13 0 10 15 3 3 15 1 14 6 5 2 9 8 6 7 2 11 1 9 4 4 8 14 7 13 11 10 1
3 9 3 1 8 15 5 12 6 5 12 6 11 3 0 7 10 2 9 14 4 8 14 0 15 11 2 13 1 4 7
```

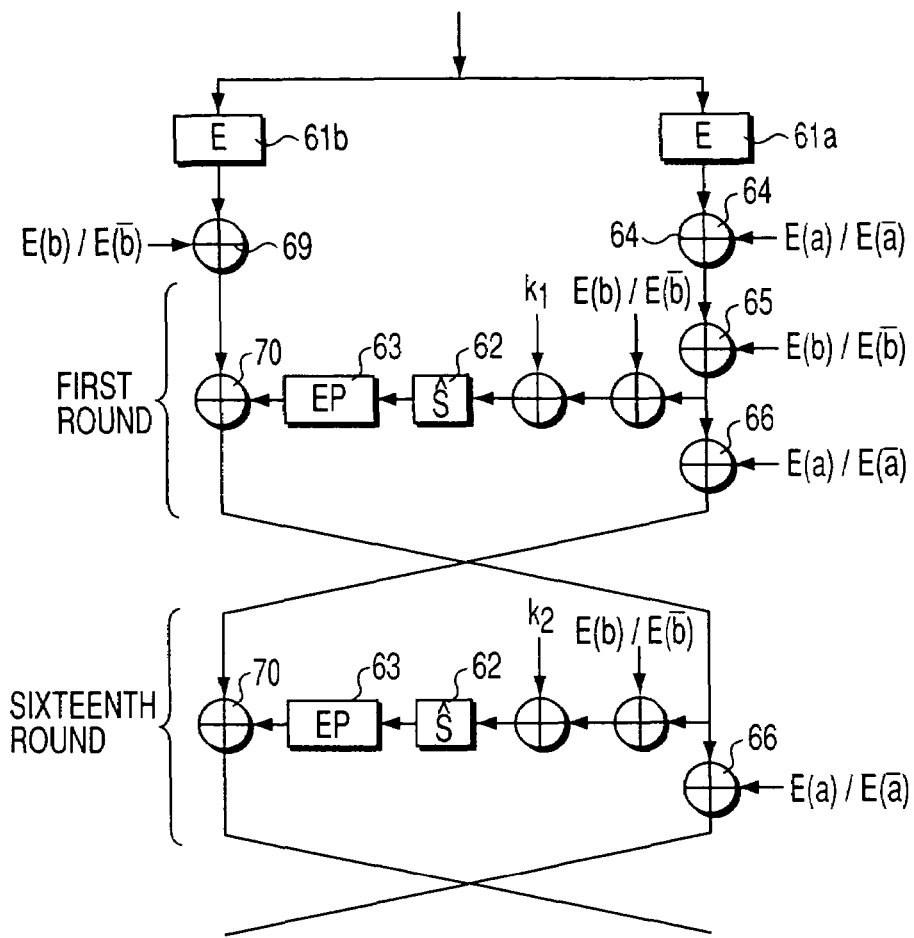
F I G. 11
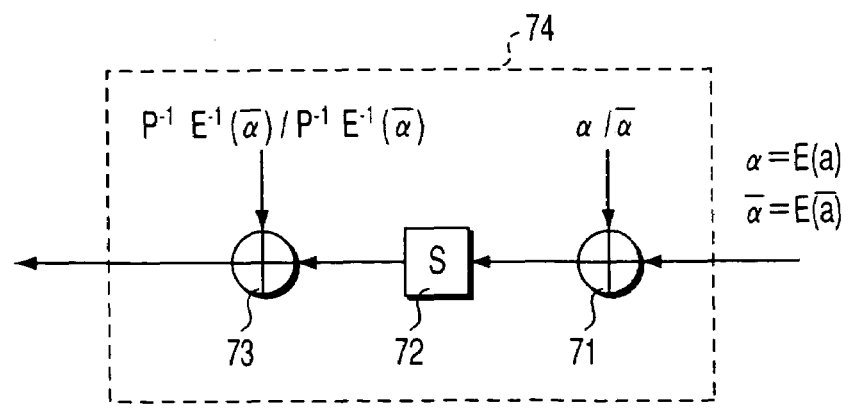
F I G. 12

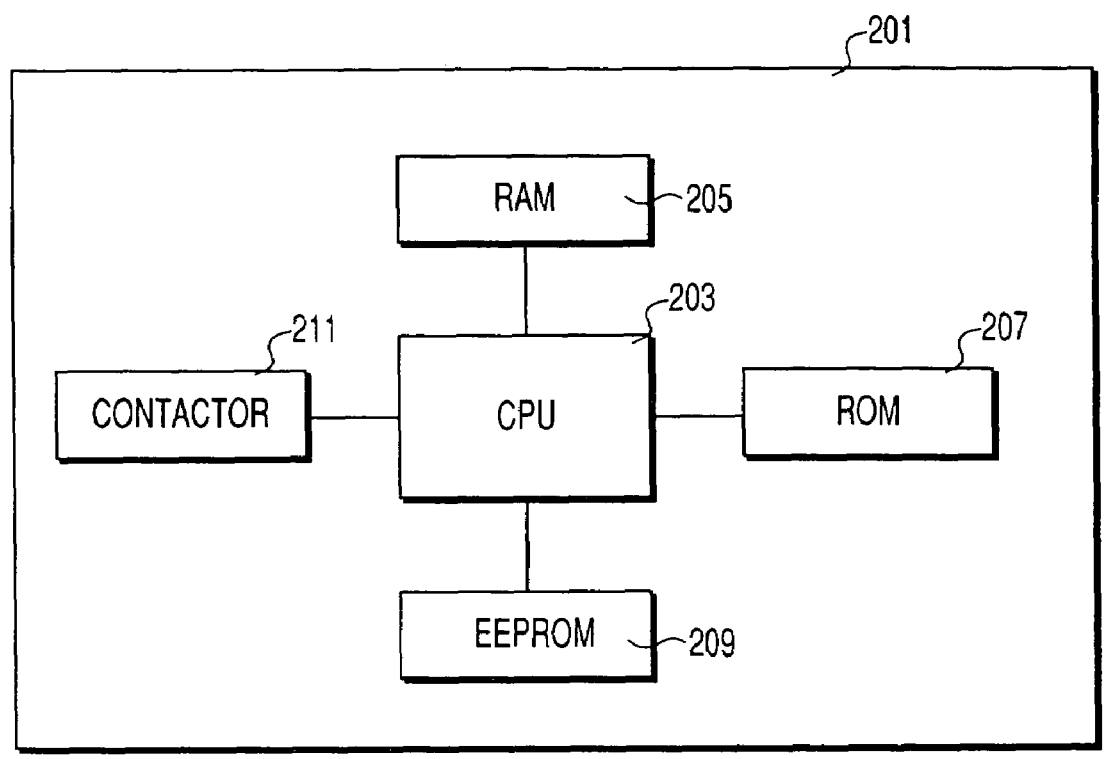
F I G. 23

US 6,940,975 B1

ENCRYPTION/DECRYPTION APPARATUS, ENCRYPTION/DECRYPTION METHOD, AND PROGRAM STORAGE MEDIUM THEREFOR

BACKGROUND OF THE INVENTION

This application is based on Japanese Patent Application No. 10-233921, filed Aug. 20, 1998, the contents of which are incorporated herein by reference.

The present invention relates to an encryption/decryption apparatus and method and, more particularly, to an encryption/decryption apparatus and method which use secret key block encryption and a program storage medium therefor.

The DES (Data Encryption Standard) is secret key block cipher that has currently been used most widely, which is described in detail in Jpn. Pat. Appln. KOKAI Publication No. 51-108701.

The DES has been evaluated in various viewpoints, and cryptanalysis such as a differential cryptanalysis and linear cryptanalysis, which are more effective than a key exhaustive search method, have been proposed.

Note that the differential cryptanalysis is disclosed in E. Biham and A. Shamir, "Differential Cryptanalysis of DES-like Cryptosystems," Journal of CRYPTOLOGY, Vol. 4, Number 1, 1991. The linear decryption method is disclosed in Mitsuru Matsui, "Linear Cryptanalysis of DES Cipher", Encryption and Information Security Symposium, SCIS93-3C, 1993.

There is a new cryptanalysis based on power consumption differences. In this method, power consumption differences between given bits of data (power consumption corresponding to bit 0 and power consumption corresponding to bit 1) are measured to estimate bits. In the case of the DES, for example, an input to an S-box and a corresponding output are estimated on the basis of a known ciphertext output and estimation of a key. A power consumption difference that appears when a given one bit is 0 or 1, which is estimated on the basis of the output from the S-box, is measured to check the validity of estimation, i.e., the validity of estimation of the key.

For this reason, there is a possibility that a DES ciphertext is broken by the above method, and hence higher security has been required.

BRIEF SUMMARY OF THE INVENTION

It is an object of the present invention to provide an encryption/decryption apparatus and method which make it difficult to perform decryption by a technique based on power consumption differences without changing the data encryption processing result obtained by a conventional encryption/decryption apparatus and method, and a program storage medium for the apparatus and method.

In order to achieve the above object, according to the first aspect of the present invention, there is provided an encryption apparatus for converting a plaintext block into a ciphertext block depending on supplied key information, comprising means for randomly selecting one pattern of each of pairs $a_i, \overline{a_i}$ (where $i$ is a positive integer not less than one) of one or a plurality of predetermined mask patterns and mask patterns obtained by bit inversion of the predetermined mask patterns every time encryption is performed, means for masking bits dependent on a plaintext within the apparatus with the mask pattern selected by the selection means, and means for removing an influence of the mask $\underline{a}$ from a ciphertext before the ciphertext is output.

According to the second aspect of the present invention, there is provided an encryption apparatus for converting a plaintext block into a ciphertext block depending on supplied key information, comprising means for randomly selecting one pattern of each of pairs $a_i, \overline{a_i}$ (where $i$ is a positive integer not less than one) of one or a plurality of predetermined mask patterns and mask patterns obtained by bit inversion of the predetermined mask patterns every time encryption is performed, means for masking intermediate bit data within the apparatus with the mask pattern selected by the selection means, and means for removing an influence of the mask $\underline{a}$ from the intermediate bit data masked by the masking means.

According to the third aspect of the present invention, there is provided an encryption method of converting a plaintext block into a ciphertext block depending on supplied key information, comprising the steps of randomly selecting one pattern of each of pairs $a_i, \overline{a_i}$ (where $i$ is a positive integer not less than one) of one or a plurality of predetermined mask patterns and mask patterns obtained by bit inversion of the predetermined mask patterns every time encryption is performed, masking bits dependent on a plaintext within the method with the selected mask pattern, and removing an influence of the mask $\underline{a}$ from a ciphertext before the ciphertext is output.

According to the fourth aspect of the present invention, there is provided an encryption method of converting a plaintext block into a ciphertext block depending on supplied key information, comprising the steps of randomly selecting one pattern of each of pairs $a_i, \overline{a_i}$ (where $i$ is a positive integer not less than one) of one or a plurality of predetermined mask patterns and mask patterns obtained by bit inversion of the predetermined mask patterns every time encryption is performed, masking intermediate bit data within the method with the selected mask pattern, and removing an influence of the mask a from the masked intermediate bit data.

According to the fifth aspect of the present invention, there is provided a computer-usable program storage medium storing computer-readable program code means for converting a plaintext block into a ciphertext block depending on supplied key information, comprising computer-readable program code means for causing a computer to randomly select one pattern of each of pairs $a_i, \overline{a_i}$ (where $i$ is a positive integer not less than one) of one or a plurality of predetermined mask patterns and mask patterns obtained by bit inversion of the predetermined mask patterns every time encryption is performed, computer-readable program code means for causing the computer to mask bits dependent on a plaintext within the method with the selected mask pattern, and computer-readable program code means for causing the computer to remove an influence of the mask $\underline{a}$ from a ciphertext before the ciphertext is output.

According to the present invention, original data is masked, and the mask is removed immediately before it is inputted to each S-box. When this mask is removed, there is a possibility that the data may be broken by the above technique based on power consumption differences. For this reason, according to the present invention, mask removal processing immediately before the data is input to each S-box, input operation of the original data to each S-box immediately after mask removal, and masking operation for the output from each S-box are calculated in advance and stored as a table, and the calculation result is obtained by looking up the table. For this reason, neither calculation of an exclusive OR for mask removal nor calculation of an exclusive OR for masking are performed during encryption and decryption, the data cannot be decrypted by the technique based on power consumption differences.

According to the present invention, consistency of encryption and decryption is ensured, and security against the decryption technique based on power consumption differences can be improved by making it difficult to decrypt data by the technique based on power consumption differences.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A is a circuit diagram showing an arrangement in which a mask is added to the input round according to the present invention;

FIG. 5B is a circuit diagram showing an arrangement in which a mask is added to the final round according to the present invention;

FIG. 6 is a table showing an expansion E;

FIG. 7 is a table showing a permutation P;

FIG. 11 is a block diagram showing an arrangement obtained by adding masks to the round functions in the arrangement in FIG. 10;

FIG. 12 is a block diagram showing the arrangement of $\hat{S}$ in FIG. 11;

FIG. 23 is a block diagram showing the arrangement of an IC card that implements the encryption/decryption method, and program storage medium therefor according to the present invention described above.

DETAILED DESCRIPTION OF THE INVENTION

An embodiment of the present invention will be described below with reference to the views of the accompanying drawing.

Figure 1:
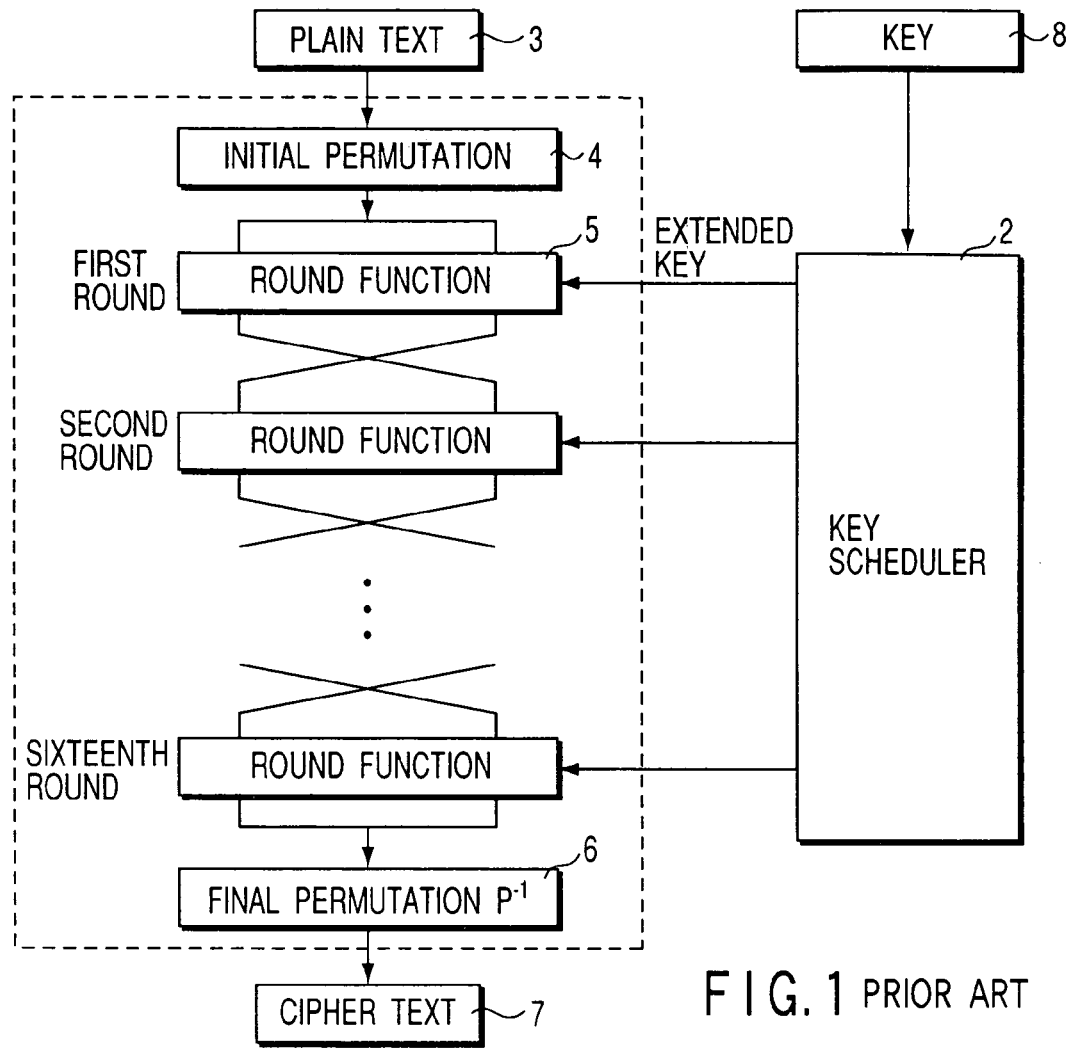
FIG. 1 is a block diagram showing the overall arrangement of a DES algorithm.

FIG. 1 shows an arrangement of an encryption algorithm DES to which the present invention is applied. This arrangement is comprised of a data randomizer 1 including 1st to 16th rounds for scrambling a plaintext (64 bits) 3 depending on an externally input key 8 and outputting a corresponding ciphertext and a key scheduler 2 for expanding key information $\underline{k}$ into an intermediate key to be supplied to the data randomizer 1.

Referring to FIG. 1, the plaintext (64 bits) 3 is subjected to an initial permutation IP 4 first, and then divided into two equal halves. The left 32-bit data and right 32-bit data of the two equal halves are respectively input to a round function 5. The structure of the round function will be described later. The left 32-bit data and right 32-bit data output from the round function are interchanged and input to the next round function.

After these data are processed by the 16 round functions, a ciphertext 7 is output by a final permutation $IP^{-1}$ 6.

Figure 2:
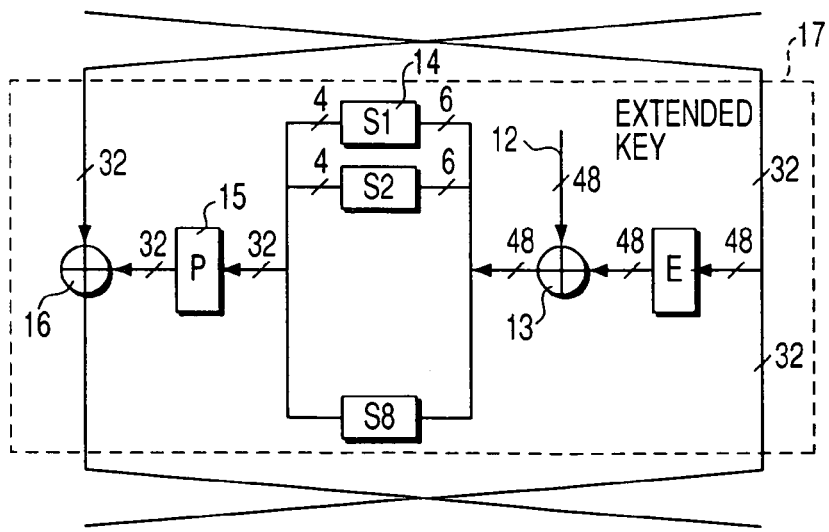
FIG. 2 is a block diagram showing the arrangement of the round functions of the DES.

FIG. 2 is a block diagram showing the details of the round function 5 in FIG. 1. A round function 17 is constituted by a permutation E 11, exclusive OR 13, S-boxes 14, permutation P 15, and exclusive OR 16.

Figures 3, 4:
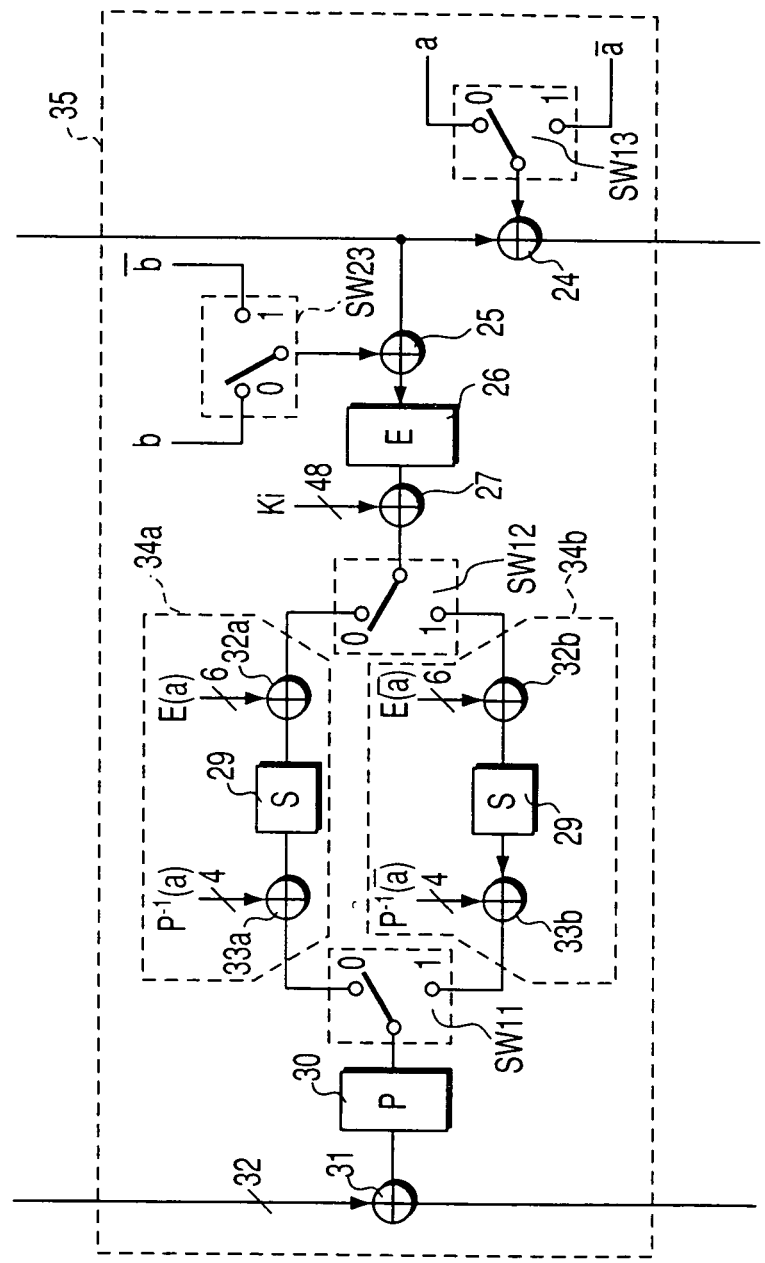
FIG. 3 is a table showing an example of the contents of an S-box conforming to a DES standard table.
FIG. 4 is a block diagram showing an arrangement in which masks are added to round functions according to the present invention.

The right 32-bit data is extended into 48-bit data by the permutation E 11. The resultant data is output to the exclusive OR 13. The exclusive OR 13 outputs the exclusive OR of the output from the permutation E 11 and an extended key 12. The 48-bit data output from the exclusive OR 13 is equally divided into 6-bit data. Each 6-bit data is input to a corresponding one of the S-boxes 14. In this embodiment, each S-box is formed from a table, and outputs 4-bit data with respect to a 64-entry 6-bit input. According to S1 based on the DES, if the left and right ends of a 6-bit input are respectively regarded as the first and sixth bits, a row in a table of the S-box in FIG. 3 is designated by the first and sixth bits regarded as binary numbers. Note that the row numbers in the table of the S-box shown in FIG. 3 are counted from above as the 0th, 1st, 2nd, and 3rd rows. A column number is then designated by the four remaining bits regarded as a binary number. The column numbers are also counted from the left end as the 0th 1st, 2nd, 3rd, . . . , 15th columns. If, for example, 011011 is input to S1, the row number is 01. That is, the second row from above is designated. Since the column number is 01101, i.e., 13 (14th column from left), the value in the table is 15. Therefore, S1 outputs this value in binary notation, i.e., 0101. Referring to FIG. 3, each output from the S-box is designated by a row and column. In general, however, such an S-box is formed as a table corresponding to inputs ranging from 0 to 63. The 32-bit data obtained by combining outputs from the respective S-boxes is subjected to bit permutation operation by the permutation P 15. The resultant data is output to the exclusive OR 16. The exclusive OR 16 outputs the exclusive OR of the left 32-bit data and the output from the permutation P 15.

FIG. 4 is a circuit diagram showing the details of the round function 5 in FIG. 4 and the round function 17 in FIG. 2. FIG. 5A shows an arrangement for an input to the first round function. FIG. 5B shows an arrangement for an output from the 16th round function.

An embodiment of the present invention will be described in detail below with reference to FIGS. 4, 5A, and 5B.

Referring to FIG. 4, reference symbols $a$ and $b$ respectively denote 32-bit masks; and $\bar{a}$, inversion of all bits. In a round function 35 in FIG. 4, an exclusive OR 25 calculates the exclusive OR of the right 32-bit data and an output from a switch SW23 and outputs it to an expansion E 26. An output from the expansion E 26 is exclusive-ORed with an extended key Ki by an exclusive OR 27. The resultant data is output to a switch SW12. The switch SW12 causes the data to branch in accordance with a random number sequence Rij. If Rij is 0, the switch SW12 causes the data to branch to the 0 side. If Rij is 1, the switch SW12 causes the data to branch to the 1 side.

FIG. 4 shows the arrangement of each S-box after branching at the switch SW12. An S-box 29 corresponds to S1 to S8 based on the DES.

When the switch SW12 causes data to branch to the 0 side, the process indicated by a dashed line 34a is performed. More specifically, an exclusive OR 32a calculates the exclusive OR of the output from the exclusive OR 27 and six bits (E(a)) of the result obtained by performing the expansion E for the mask $a$ which corresponds to an input of the S-box, and outputs the resultant data to the S-box 29. The S-box 29 outputs the result obtained by looking up the table of the S-box to an exclusive OR 33a.

The exclusive OR 33a calculates the exclusive OR of bits of $p^{-1}(a)$ as the result obtained by performing inverse permutation $p^{-1}$ for the mask $a$ and the output from the S-box 29, and outputs the resultant data to the switch SW11.

When the switch SW12 causes the data to branch to the 1 side, the process indicated by a dashed line 34b is performed. More specifically, an exclusive OR 32b calculates the exclusive OR of the output from the exclusive OR 27 and bits of the result obtained by performing the expansion E for the mask $\bar{a}$ which corresponds to an input of the S-box, and outputs the resultant data to the S-box 29. The S-box 29 looks up the table of the corresponding S-box and outputs the resultant data to the exclusive OR 33b.

The exclusive OR 33b calculates the exclusive OR of four bits of $p^{-1}(\bar{a})$ as the result obtained by performing inverse permutation $p^{-1}$ of a permutation P(30) for the mask $\bar{a}$ which corresponds to an output from the S-box and the output from the S-box 29, and outputs the resultant data to the switch SW11.

Note that the processes indicated by the dashed lines 34a and 34b must not be performed during encryption and decryption. This is because, even if data is concealed with the above mask, since input/output operation of the S-box 29 is not concealed, cryptanalysis may be attempted by using power consumption differences in S-box processing.

Figures 8, 9, 10:
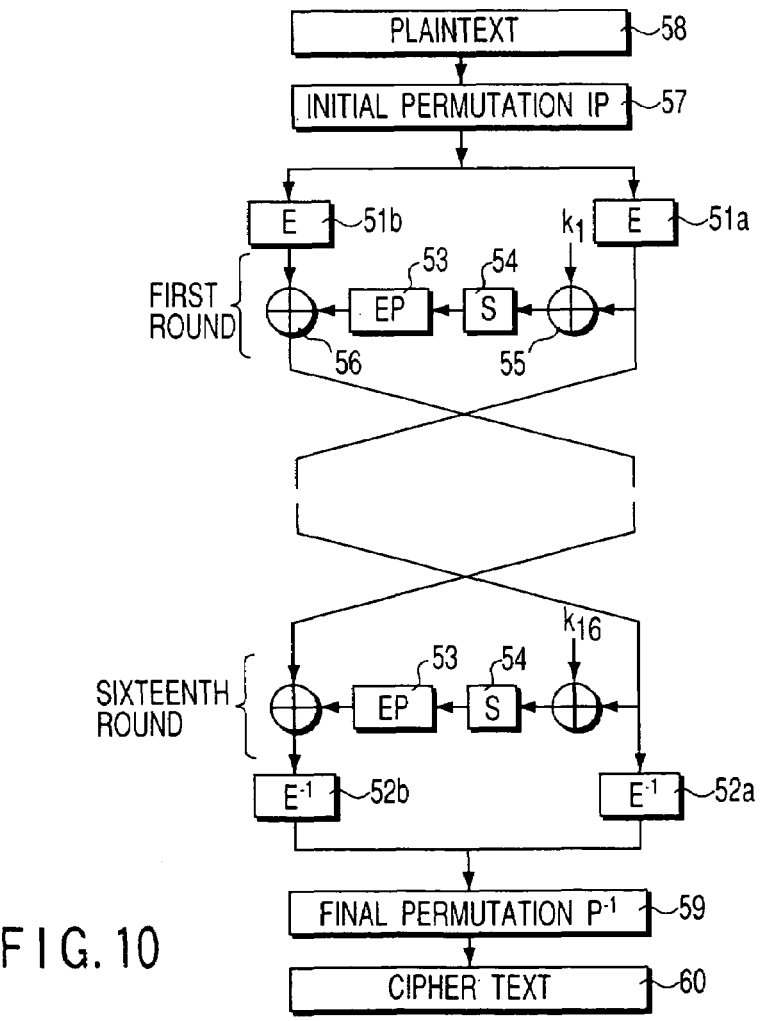
FIG. 8 is a view showing a concealed output from S1 which corresponds to an input (000000, 000001, . . . 111111) in the use of a mask $\underline{a}$.
FIG. 9 is a table of a mask $\overline{\underline{a}}$ (bit inversion of $\underline{a}$)
FIG. 10 is a block diagram showing an arrangement of a DES algorithm according to an embodiment.

In this embodiment of the present invention, the results of the processes indicated by the dashed lines 34a and 34b are obtained first by pre-calculation performed before encryption and decryption, and encryption processing and decryption processing are then performed. For example, a table in which the index of each input to each S-box and a corresponding output are rewritten is prepared for each S-box, and is used for encryption and decryption. In this case, a table of an S-box corresponding to the mask $a$ and a table of an S-box corresponding to the mask $\bar{a}$ are prepared. For example, the following is the result obtained by calculating the process block 34a in FIG. 4 using the mask a. Assume that the mask a is (0110 1111, 1100 1010 0110 1100 1100 0011). The expansion E is expressed by the table shown in FIG. 6. In the table shown in FIG. 6, the respective rows correspond to inputs to S1, S2, . . . , S8 from above. In addition, the first bit on the left end of each column corresponds to the first bit of an input to a corresponding S-box. Each number in the table represents the Xth bit of a corresponding input to the expansion E. That is, the input to S1 includes the 32nd, 1st, 2nd, 3rd, 4th, and 5th bits of the input to E. With the above mask $a$, therefore, a bit mask (a) corresponding to the input to S1 is (101101). FIG. 7 shows a table of the permutation P. Referring to FIG. 7, the numbers sequentially correspond to the first to 32nd bits of the output from P from the left (the first and second rows are contiguous). Each term represents the Xth bit of an input. That is, the first bit of the output from permutation P is the 16th bit of the input. The bits corresponding to S1 are the 1st, 2nd, 3rd, and 4th bits of the input to the permutation P, and hence respectively correspond to the 9th, 17th, 23rd, and 31st bits of the output from P. Since a mask corresponding to the output from S1 is $p^{-1}(a)$, i.e., the output from P is $a$, the 9th, 17th, 23rd, and 31st bits of the mask a become $p^{-1}(a)$. The mask corresponding to the output from S1 is therefore (1001). With the above mask $a$, therefore, a bit mask E(a) corresponding to the input to S1 is (101101), and a bit mask $p^{-1}(a)$ corresponding to the output from S1 is (1001). According to the actually formed table corresponding to the mask $a$, the output from S1 is calculated by using the result of the exclusive OR of the input and the bit mask E(a) as the input to S1, and an output from the table is obtained by adding the bit mask $p^{-1}(a)$ to the output from S1 by exclusive OR. FIG. 8 shows an output (corresponding to an input of 0 to 63) of concealed S1 when the input corresponds to (000000, 000001, . . . , 111111), in the case of the above mask $a$. FIG. 9 shows a table of the mask $\bar{a}$ (bit inversion of $a$).

The outputs from the respective process blocks indicated by the dashed lines 34a and 34b are permutated by a permutation P 30. The resultant data is output to an exclusive OR 31. The exclusive OR 31 calculates the exclusive OR of the left 32-bit data and the output from the permutation P 30. An exclusive OR 24 calculates the exclusive OR of the right 32-bit data and the output from the switch SW13 to obtain new right 32-bit data.

Referring to FIG. 5A, the result obtained by permutating the plaintext (64 bits) by initial permutation IP 41a is divided into equal halves, i.e., right 32-bit data and left 32-bit data. An exclusive OR 44a calculates the exclusive OR of the left 32-bit data and an output from a switch SW21.

The output from this exclusive OR 44a becomes the left 32-bit data of an input of the first round function. An exclusive OR 42a calculates the exclusive OR of the right 32-bit data and an output from a switch SW14. An exclusive OR 43a calculates the exclusive OR of the output from the exclusive OR 42a and an output from a switch SW22.

The output from the exclusive OR 43a becomes the right 32-bit data of an input of the first round function. In the case shown in FIG. 5A, the sequence of the exclusive ORs 42a and 43a may be interchanged in accordance with the characteristics of the exclusive ORs.

Referring to FIG. 5B, the result obtained by permutating the plaintext (64 bits) by initial permutation IP 41a is divided into equal halves, i.e., right 32-bit data and left 32-bit data. An exclusive OR 44b calculates the exclusive OR of the left 32-bit data and the output from the switch SW21. This eliminates the influence of the mask in the exclusive OR 43a in FIG. 5A. The output from the exclusive OR 44b is input to a final permutation $IP^{-1}$ 41b. An exclusive OR 42b calculates the exclusive OR of the right 32-bit data and the output from the switch SW14. An exclusive OR 43b calculates the exclusive OR of the output from the exclusive OR 42b and the output from switch SW22. This eliminates the influence of the mask in the exclusive OR 44a in FIG. 5A. The output from the exclusive OR 43b is input to the final permutation $IP^{-1}$ 41b. Referring to FIG. 5B, the sequence of the exclusive ORs 42b and 43b may be interchanged in accordance with the characteristics of the exclusive ORs.

The characteristics of the arrangement shown in FIGS. 4, 5A, and 5B will be described below.

The exclusive ORs 44a, 42a, and 43a conceal data by using masks such as the masks a and b. With this operation, in the data scrambler, it is difficult to observe the left 32-bit data and right 32-bit data from the outside world. If, however, data is concealed by using the above masks, inputs to the respective S-boxes 14 in FIG. 2 differ from the original plaintext data, and hence outputs from the S-boxes differ. Therefore, the output ciphertext does not correspond to the original plaintext data.

In order to solve the above problem, in each round function, the exclusive OR 25 in FIG. 4 calculates the exclusive OR of the mask b or mask $\overline{b}$. This eliminates the influence of concealment using the mask b or $\overline{b}$ added in FIG. 5A. If the switch SW12 causes the data to branch to the 0 side, the exclusive OR 32a eliminates the influence of concealment using the mask a in FIG. 5A. That is, the input to S29 becomes the same as the original plaintext input. The output from S29 is concealed again by the exclusive OR 33a using the mask a. In this case, the process block 34a is performed in advance by looking up the table, no significant changes in power consumption data directly associated with the input/output operation of S29 can be observed from the outside world.

The exclusive OR 24 in FIG. 4 temporarily eliminates the influence of the mask a or $\overline{a}$ on the right 32-bit data. However, the right 32-bit data is still concealed by the mask b or $\overline{b}$, and hence security is ensured. The right 32-bit data becomes left 32-bit data on the next round. The exclusive OR 31 calculates the exclusive OR of the left 32-bit data and the output from permutation P30. As a consequence, the data is concealed by the mask a (or $\overline{a}$) and mask b (or $\overline{b}$) and becomes a right input on the next round. As described above, therefore, consistency among the respective S-boxes is maintained in terms of DES for translation.

At the output of the final round, to eliminate the influence of each mask on concealment in FIG. 5A, the exclusive OR using each mask in FIG. 5B is performed.

The switches SW11, SW12, SW13, and SW14 are controlled by a random number sequence {Rli}. The switches SW21, SW22, and SW23 are controlled by a random number sequence {R2i}. For example, each switch selects a branch to the 0 side when Rji=0, and selects a branch to the 1 side when Rji=1. The random number sequences {R1i} and {R2i} for controlling the switches are characterized by being changed for each of encryption and decryption processes for the respective blocks. For example, in a given encryption process, all the switches SW11, SW12, SW13, and SW14 on the respective rounds perform processing on the 0 side. In another encryption process, all the switches SW11, SW12, SW13, and SW14 on the respective round perform processing on the 1 side.

If there is a clear relationship of dependence between the random number sequences {R1i} and {R2i}, an attacker has a clue to the estimation of the masks a and b, random number sequences having no clear relationship of dependence are used as the random number sequences {R1i} and {R2i}. Ideally, the use of two random number sequences which are statistically independent is recommended. In practice, however, even if there is a statistical dependence relationship, this cryptanalysis technique is effective as a measure against cryptanalysis based on power consumption differences, as long as the relationship is sufficiently weak. Two m sequence generators may be prepared as means for implementing the present invention, and outputs from the first and second m sequence generators may be respectively set to {R1j} and {R2j}. If the period of an m sequence is sufficiently long and the sequence lengths of the two m sequence generators, corresponding convention polynomials, and part or all of initial values are made to differ from each other, the above condition can be sufficiently satisfied. As another means for implementing random number sequences, one m sequence generator may be prepared to generate two bits for each encryption or decryption process. The first and second bits are respectively used as {R1j} and {R2j}.

Although the m sequence generators are presented as practical examples in this case, any random number sequence generator can be used as long as security in practice can be ensured. Note that these random number sequences must be implemented so as not to be estimated from the outside world. According to still another implementation means, random number sequences may be stored in a memory in advance to be sequentially referred to. Note that these random number sequences must be implemented so as not to be estimated from the outside world.

Referring to FIGS. 4, 5A, and 5B, the number of 1s of a bit sequence, i.e., a Hamming weight, is defined as H(a). In cryptanalysis using the technique based on power consumption differences, power consumption differences in a data encryption process are observed to acquire information about an encryption key. The concealment of data using the above masks makes it difficult to bring power consumption measurement from the outside world into correspondence with processed data. If, however, the Hamming weights of masks differ from each other, only data using only the masks a and b may be extracted in accordance with measurement of a plurality of encryption data and statistical information. If, only such data can be extracted, a key can be extracted as in the prior art by using the cryptanalysis technique based on power consumption differences. Since the currently used mask can be discriminated as the mask a or $\overline{a}$ in this manner, satisfactory countermeasures cannot be taken. If, for example, the Hamming weights of the masks a and ā or masks b and b̄ are set to be equal, it is difficult to discriminate the masks by measurement from the outside world, thus ensuring security. If, however, the bit weights of the masks are offset, the security greatly deteriorates.

Referring to FIGS. 4, 5A, and 5B, if, therefore, masks that satisfy H(a)=H(ā)=H(b̄)=H(b̄)=n/2= 16 are selected (the Hamming weights of the masks are equal to each other), high security is ensured. In this case, since a bit count n of each of the masks a and b is 32, a mask value of 16 is preferably used as the bit weight of each of the masks a and b and the bit inversions of the masks a and b. Ideally, as described above, a mask having a Hamming weight corresponding to half of the bit length of the mask is preferably used. However, the same effect as described above can be obtained by using two masks having almost the same Hamming weight. In other words, if the Hamming weight indicating the number of bits 1 of an n-bit long bit sequence x is defined as H(x), the Hamming weight H(a) of the mask a satisfies 0<H(a)<n. Alternatively, the absolute value of the difference between the Hamming weight H(a) of the mask a and the Hamming weight H(ā) of the bit inversion ā of the mask a is less than n/2.

That is, if the Hamming weights of the respective masks are not extremely offset, it is not easy to discriminate the masks by measurement from the outside world. Therefore, the effect of a countermeasure against the technique based on power consumption differences can be obtained.

Consider the characteristics of the expansion E 26 based on the DES in FIG. 4. For the same reason as that for the selection of a mask value in consideration of Hamming weights, masks whose Hamming weights E(a) and E(ā) applied to the exclusive ORs 32a and 32b are equal to each other are selected. That is, masks satisfying H(E(a))=H(E(ā)) are selected.

When the above mask condition is applied to the implementation of the DES, for example, it is required that both the number of 1s of the "first bits" (the bits on the left ends) of the respective 4-bit blocks of the mask a and the number of 1s of the "fourth bits" (the bits on the right ends) of the respective 4-bit blocks of the mask a are 4 each. That is, this embodiment is characterized by selecting the masks a and b that satisfy the above condition. As mask value that satisfy the above condition, $(1000001111101101111001010010001)_2$, $(1101101001100101001101011000101010)_2$, and the like can be used.

Ideally, the use of mask values that satisfy the above condition is recommended. However, a similar effect can be obtained if "the number of 1s of the "first bits" of the respective 4-bit blocks of the mask a" and "the number of 1s of the "fourth bits" of the respective 4-bit blocks of the mask a" are not extremely offset.

In using the mask values that satisfy the above condition, when there is no clear correspondence between the random number sequences {R1j} and {R2j} for controlling the switches, even if the same mask value is used for the masks a and b, effective countermeasures can be taken against decryption using the technique based on power consumption differences.

The DES arrangement shown in FIG. 1 is most widely known. However, DES arrangement methods having undergone various equivalent modifications to attain an increase in processing speed have been known.

Modifications in which the present invention is applied to the DES will be described below.

FIG. 10 shows an equivalent modification of the DES. In the implementation of the DES in FIG. 10, in order to improve the processing efficiency, the permutation E 11 and the permutation P 15 are integrated into one permutation and processed as an EP 53. The output obtained by permutating an input plaintext 58 by an initial permutation IP 57 is divided into equal halves. The right 32-bit data is input to an expansion E 51a, and the left 32-bit data is input to an expansion E 51b. The 48 bits output from the expansion E 51a are the right 48 bits of an input to the first round. The 48 bits output from the expansion E 51b are the left 48 bits of an input to the first round. An exclusive OR 55 calculates the exclusive OR of the right 48 bits of the input and an extended key K1, and outputs the resultant data to an S-box 54. The S-box 54 outputs a corresponding output to the EP 53 by looking up the table. The EP 53 permutates the input and outputs the resultant data to an exclusive OR 56. The exclusive OR 56 calculates the exclusive OR of the left 48 bits output from the expansion E 51a and the output from the EP 53. The resultant data becomes the right 48 bits of an input to the next round. The above processing on the first round is repeated up to the 16th round. The right 48 bits output from the 16th round are input to a contraction permutation $E^{-1}$ 52a, and the left 48 bits are input to a contraction permutation $E^{-1}$ 52b. The respective 32-bit outputs are input to a final permutation $IP^{-1}$ 59. As a consequence, a 64-bit ciphertext 60 is output.

A method of preventing cryptanalysis using the technique based on power consumption differences by applying the present invention to such a modified DES will be described below.

FIG. 11 shows an embodiment of the implementation of the DES in FIG. 10 according to the present invention. Referring to FIG. 11, "E(a)/E(ā)" indicates how the switch SW23 applies a mask based on an exclusive OR. That is, "E(a)/E(ā)" indicates the mask E(a) or E(ā).

FIG. 11 shows an embodiment which indicates that the present invention shown in FIGS. 4, 5A, and 5B can be applied to the implementation of the DES in FIG. 10.

The output obtained by performing an initial permutation for an input plaintext is divided into two equal halves. The right 32-bit data is input to an expansion E 61a, and the left 32-bit data is input to an expansion E 61b. An exclusive OR 64 calculates the exclusive OR of the 48-bit data output from the expansion E 61a and the mask E(a)/E(ā) and outputs the resultant data to an exclusive OR 65. The exclusive OR 65 calculates the exclusive OR of the output from the exclusive OR 64 and the mask E(b)/E(b̄) to obtain the right 48 bits of an input to the first round. Note that the sequence of the exclusive ORs 64 and 65 may be interchanged depending on the characteristics of the exclusive ORs.

An exclusive OR 69 calculates the exclusive OR of the 48-bit data output from the expansion E 61b and the mask E(b)/E(b̄) to obtain the left 48 bits of an input to the first round.

An exclusive OR 66 calculates the exclusive OR of the right 48 bits of the input and the mask E(a)/E(ā) to obtain the left 48 bits of an input to the next round. An exclusive OR 67 calculates the exclusive OR of the right 48 bits of the input and the E(b)/E(b̄) and outputs the resultant data to an exclusive OR 68. The exclusive OR 68 calculates the exclusive OR of the output from the exclusive OR 67 and the extended key K1 and outputs the resultant data to Ŝ 62 ("^" indicates exponentiation). The structure of Ŝ 62 will be described later. The output from Ŝ 62 is permuted by an EP 63 and output to an exclusive OR 70.

The shift register 70 calculates the exclusive OR of the left 48 bits of the input data and the output from the EP 63 to obtain the right 48 bits of an input to the next round. The processing on the first round is repeated up to the 16th round. The output from the final round is subjected to processing reverse to that for the input to the first round. More specifically, the right 48 bits are subjected to the exclusive OR 65, exclusive OR 64, and contraction permutation $E^{-1}$, whereas the left 48 bits are subjected to the exclusive OR 65 and contraction permutation $E^{-1}$. The resultant two 32-bit data are output to the final permutation.

FIG. 12 shows the structure of $\hat{S}$ 62 in FIG. 11.

Referring to FIG. 12, $\alpha = E(a)$ and $\bar{\alpha} = E(\bar{a})$. An exclusive OR 71 calculates the exclusive OR of an input to $\hat{S}$ 62 and a mask $\alpha$ or $\bar{\alpha}$ and inputs the resultant data to an S-box 72. An exclusive OR 73 calculates the exclusive OR of the output from the S-box 72 and a mask $p^{-1}E^{-1}(\alpha)$ or $p^{-1}E^{-1}(\bar{\alpha})$ to obtain an output from $\hat{S}$ 62.

That is, a block 74 in FIG. 12 corresponds to the process blocks 34a and 34b including the switches SW12 and SW11 in FIG. 4. Note, however, that the process in the block 74 must not be performed during encryption and decryption. This is because, even if data is concealed with the above mask, since input/output operation of the S-box 72 is not concealed, cryptanalysis may be attempted by using power consumption differences in S-box processing.

The embodiment of the present invention is characterized in that the result of the process in the block 74 is obtained first by calculation performed in advance before encryption and decryption, and are then used for encryption processing and decryption processing. For example, a table in which the index of each input to each S-box and a corresponding output are rewritten is prepared for each S-box and used as $\hat{S}$ for encryption processing and decryption processing. In this case, an $\hat{S}$ table corresponding to the mask $\alpha$ and an $\hat{S}$ table corresponding to the mask $\bar{\alpha}$ are prepared in each S-box.

Figure 13:
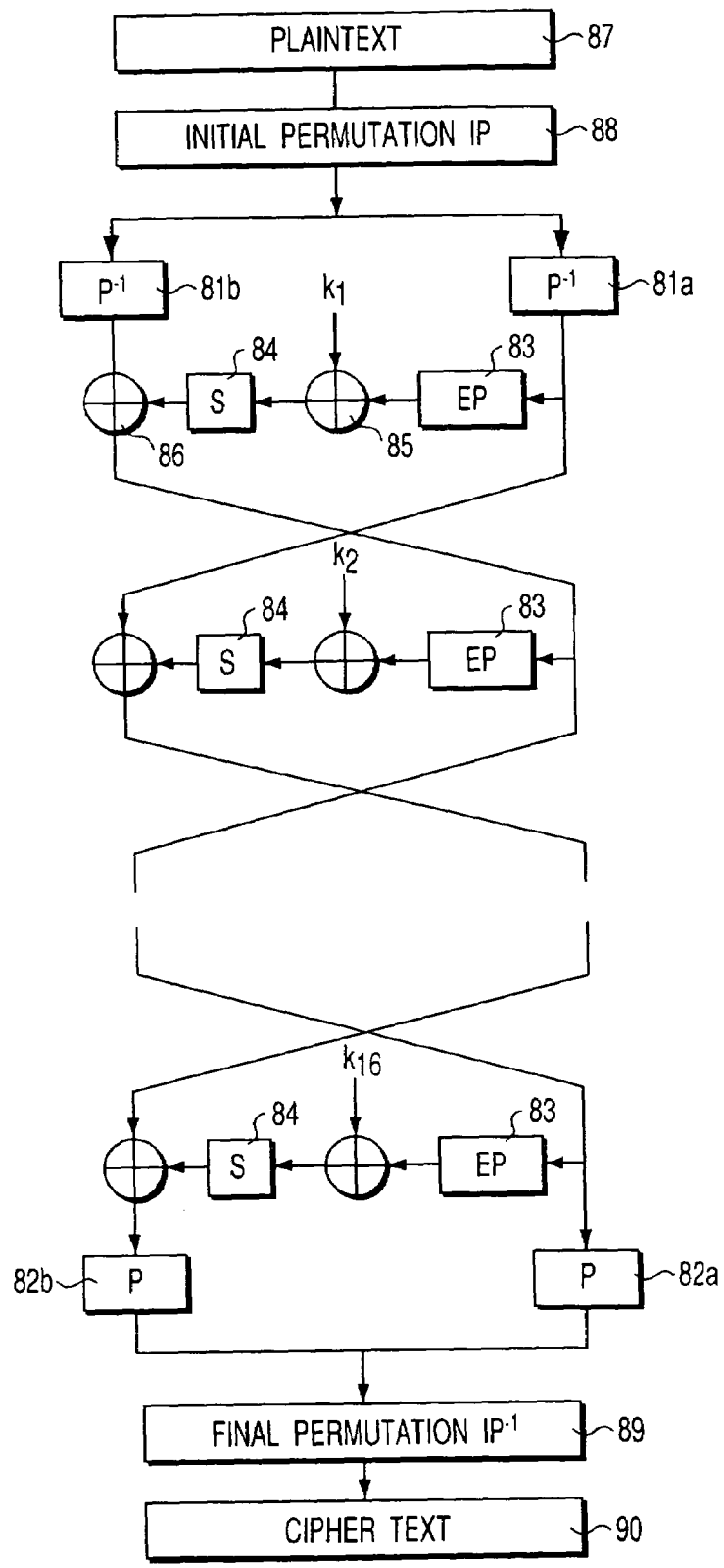
FIG. 13 is a block diagram showing another arrangement of a DES algorithm according to an embodiment.

FIG. 13 shows another equivalent modification of the DES.

In the implementation of the DES in FIG. 13, in order to improve the processing efficiency, the expansion E 11 and permutation P 15 are integrated into one permutation and processed as an EP 83. The output obtained by permutating an input plaintext 88 by an initial permutation IP 87 is divided into two equal halves. The right 32-bit data is input to a permutation $p^{-1}$ 81a, and the left 32-bit data is input to a permutation $p^{-1}$ 81b. The 32 bits output from the permutation $p^{-1}$ 81b are the right 32 bits of an input to the first round. The 32 bits output from the permutation $p^{-1}$ 81b are the left 32 bits of an input to the first round. The right 32 bits of the input are input to the EP 83, and the resultant data obtained by performing an expansion for the input is output to an exclusive OR 85. The excitation reconstruction section 85 calculates the exclusive OR of the data and the extended key K1 and outputs the resultant data to an S-box 84. The S-box 84 outputs a corresponding output to an exclusive OR 86 by looking up the table. The exclusive OR 86 calculates the exclusive OR of the left 32 bits output from the expansion E 81b and the output from the S-box 84 to obtain the right 32 bits of an input to the next round. The processing on the first state is repeated up to the 16th round.

At the output of the 16th state, the right 32 bits are input a permutation P 82a, and the left 32 bits are input to a permutation P 82b. The respective 32-bit data are input to a final permutation $IP^{-1}$ 89. As a consequence, a 64-bit ciphertext 90 is output. A method of preventing cryptanalysis using the technique based on power consumption differences by applying the present invention to such a modification of the DES will be described below.

Figure 14:
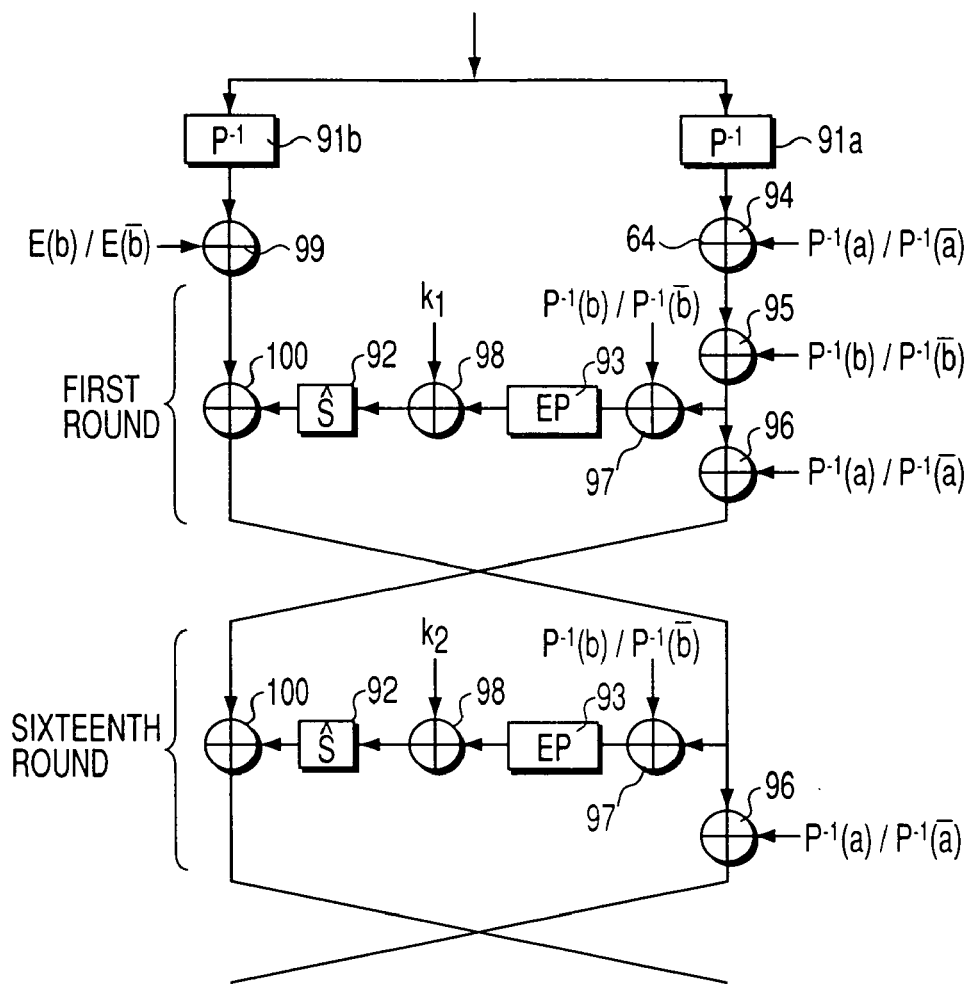
FIG. 14 is a block diagram showing an arrangement obtained by adding masks to the round functions in the arrangement in FIG. 13.

FIG. 14 shows an embodiment of the equivalent modification of the DES in FIG. 13 according to the present invention.

Referring to FIG. 14, $P^{-1}(a)/P^{-1}(\bar{a})$ indicates how the switch SW23 applies a mask based on an exclusive OR. That is, $P^{-1}(a)/P^{-1}(\bar{a})$ indicates a mask $P^{-1}(a)$ or $P^{-1}(\bar{a})$.

FIG. 14 shows an embodiment which indicates that the present invention shown in FIGS. 4, 5A, and 5B can be applied to the implementation of the DES in FIG. 13.

The output obtained by performing an initial permutation for an input plaintext is divided into two equal halves. The right side 32-bit data is input to a permutation $P^{-1}$ 91a, and the left 32-bit data is input to a permutation $P^{-1}$ 91b. An exclusive OR 94 calculates the exclusive OR of the 32 bits output from the permutation $P^{-1}$ 91a an $P^{-1}(a)/P^{-1}(\bar{a})$ and outputs the resultant data to an exclusive OR 95. The inverter circuit 95 calculates the exclusive OR of the output from the exclusive OR 94 and the mask $P^{-1}(a)/P^{-1}(\bar{a})$ to obtain the right 32 bits of an input to the first round. Note that the sequence of the exclusive ORs 94 and 95 may be interchanged depending on the characteristics of the exclusive ORs.

An exclusive OR 96 calculates the exclusive OR of the right 32 bits of the input and the mask $P^{-1}(\bar{a})/P^{-1}(a)$ to obtain the left 34 bits of an input to the next round. An exclusive OR 97 calculates the exclusive OR of the right 32 bits of the input and the mask $P^{-1}(b)/P^{-1}(\bar{b})$ and outputs the resultant data to an EP 93. The 48-bit output obtained by expansion at the EP 93 is output to an exclusive OR 98 to be exclusive-ORed with the enlarge key K1. The resultant data is output to $\hat{S}$ 92. The structure of $\hat{S}$ 92 will be described later. The output from $\hat{S}$ 92 is output to an exclusive OR 100 to be exclusive-ORed with the left 32 bits of the input data so as to obtain the right 32 bits of an input to the next round. The above processing on the first state is repeated up to the 16th round.

The output from the final round is subjected to processing reverse to that for the input to the first round. More specifically, the right 32 bits are subjected to the exclusive OR 95, exclusive OR 94, permutation P, whereas the left 32 bits are subjected to the exclusive OR 95 and permutation P. The resultant two 32-bit data are output to the final permutation.

Figure 15:
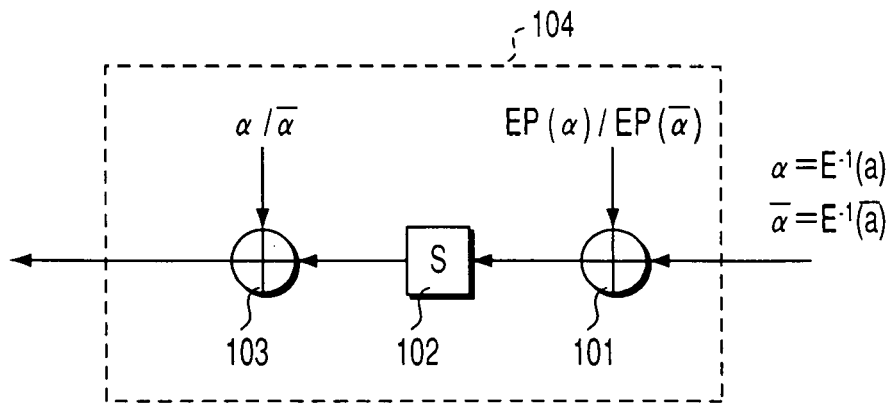
FIG. 15 is a block diagram showing the arrangement of $\hat{S}$ in FIG. 14.

FIG. 15 shows the structure of $\hat{S}$ 92 in FIG. 14.

Referring to FIG. 15, $\bar{\alpha} = P^1(a)$ and $\bar{\alpha} = P^{-1}(\bar{a})$. An exclusive OR 101 calculates the exclusive OR of an input to $\hat{S}$ 92 and a mask $\alpha$ or $\bar{\alpha}$ and inputs the resultant data to an S-box 102.

An exclusive OR 103 calculates the exclusive OR of the output from the S-box 102 and a mask $P^1E^{-1}(\alpha)$ or $P^1E^{-1}(\bar{\alpha})$ to obtain an output from $\hat{S}$ 92. That is, a block 104 in FIG. 15 corresponds to the process blocks 34a and 34b including the switches SW12 and SW11 in FIG. 4. Note, however, that the process in the block 104 must not be performed during encryption and decryption. This is because, even if data is concealed with the above mask, since input/output operation of the S-box 102 is not concealed, decryption may be attempted by using power consumption differences in S-box processing. The embodiment of the present invention is characterized in that the result of the process in the block 104 is obtained first by calculation performed in advance before encryption and decryption, and are then used for encryption processing and decryption processing. For example, a table in which the index of each input to each S-box and a corresponding output are rewritten is prepared for each S-box and used as $\hat{S}$ for encryption processing and decryption processing.

In this case, an $\hat{S}$ table corresponding to the mask α and an $\hat{S}$ table corresponding to the mask $\bar{\alpha}$ are prepared in each S-box.

An embodiment in which the present invention is applied to a key scheduler will be described next with reference FIGS. 16, 17, and 18.

A mask pattern $\underline{c}$ for masking a bit pattern K of a true key and a bit inversion pattern $\bar{c}$ are prepared. Let Kc be the value obtained by converting K with $\underline{c}$ by using designated dyadic operation, and $K\bar{c}$ be the value obtained by converting K with $\bar{c}$ by using the same dyadic operation. The values Kc and $K\bar{c}$ are stored in the memory in advance. Every time encryption or decryption is executed, one of the values Kc and $K\bar{c}$ is randomly selected and processed in the same manner as the true key. The resultant data is applied to a plaintext by the above dyadic operation, and inversion of the dyadic operation is performed to remove the influence of the pattern $\underline{c}$ or $\bar{c}$ from the output obtained by the dyadic operation. A case wherein the present invention is applied to a DES scheme as an encryption scheme using exclusive OR operation as dyadic operation will be described first. First of all, two masked keys Kc and $K\bar{c}$ are prepared:

$$Kc = K(+)c$$

$$K\bar{c} = K(+)\bar{c}$$

where (+) represents an exclusive OR for each bit.

Prior to encryption or decryption, one of the keys Kc and $K\bar{c}$ is randomly selected, and a key schedule process of the DES is performed to sequentially generate 16 extended keys. The 16 keys extended from Kc are expressed by Kci (i=1, ..., 16), and the keys extended from $K\bar{c}$ are expressed by $K\bar{c}i$ (i=1, ..., 16). The keys extended from Kc are influenced by the mask $\underline{c}$, and the keys extended from $K\bar{c}$ are influenced by the mask $\bar{c}$. This influence is determined by the key schedule process of the DES. In this case, however, the keys extended from the true key K, which is not masked, according to a key schedule are expressed by Ki (i=1, ..., 16), the exclusive OR of Ki and Kci is expressed by ci, and the exclusive OR of Ki and $K\bar{c}i$ is expressed by $\bar{c}i$. That is, ci=Ki (+)Kci $\bar{c}i$=Ki (+)$K\bar{c}i$.

In the DES, each extended key Ki is applied to a message by an exclusive OR for each bit immediately after the expansion E. In the present invention, Kci or $K\bar{c}i$ is applied in place of Ki. When Kci is applied, its influence is removed by applying ci by exclusive OR operation after the application of Kci. When $K\bar{c}i$ is applied, its influence is removed by applying $\bar{c}i$ by exclusive OR operation after the application of $K\bar{c}i$. The values ci and $\bar{c}i$ are obtained by enlarging $\underline{c}$ and $\bar{c}$ according to the key schedule of the DES in the same manner as extended keys. The value ci or $\bar{c}i$ may be generated from the mask $\underline{c}$ or $\bar{c}$ selected every time encryption or decryption is performed. However, the method of calculating ci and $\bar{c}i$ in advance is the method that can suppress the leakage of information most against observation from the outside world. In this case, two sets of 16 48-bit masks, i.e., a total of 1,536 bits, are prepared. When, for example, the present invention is applied to IC cards, since these masks can be fixed at least for each card, ci and $\bar{c}i$ can be written in the ROM. This is important especially for IC cards whose storage capacities are severely constrained. In general, when the same number of bits are to be stored, the area of a ROM is smaller than that of a RAM or EEPROM. When a 1,536-bit mask is stored in a ROM, the use efficiency of an LSI chip area becomes higher than when the mask is stored in a RAM or EEPROM.

Figure 16:
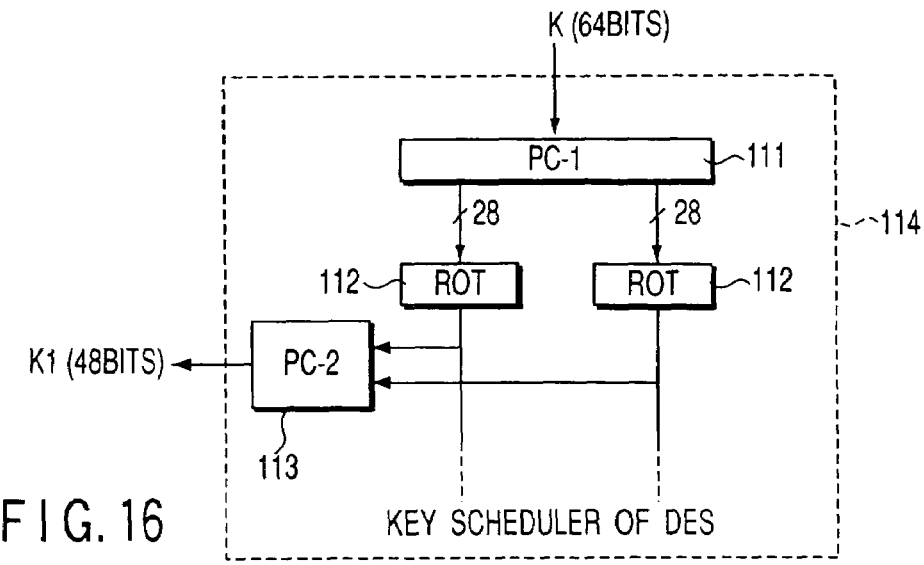
FIG. 16 is a block diagram showing the arrangement of a key scheduler of a DES algorithm.

FIG. 16 shows a key schedule of the DES.

Referring to FIG. 16, reference symbols (PC-1) 111 and (PC-2) 113 denote functions each constituted by a combination of bit selection and a permutation; and ROT 112, cyclic shift operation. (PC-1) 111 discards eight bits of an externally input 64-bit key K 115 and transfers two 28-bit sequences to the cyclic shift 112. The cyclically shifted data consisting of a total of 56 bits is input to (PC-2) 113 to output a 48-bit extended key. Referring to FIG. 16, only the extended key corresponding to one round is output. However, extended keys corresponding to the 2nd, 3rd, ..., 16th rounds are generated by repeating the cyclic shift and PC-2.

Figure 17:
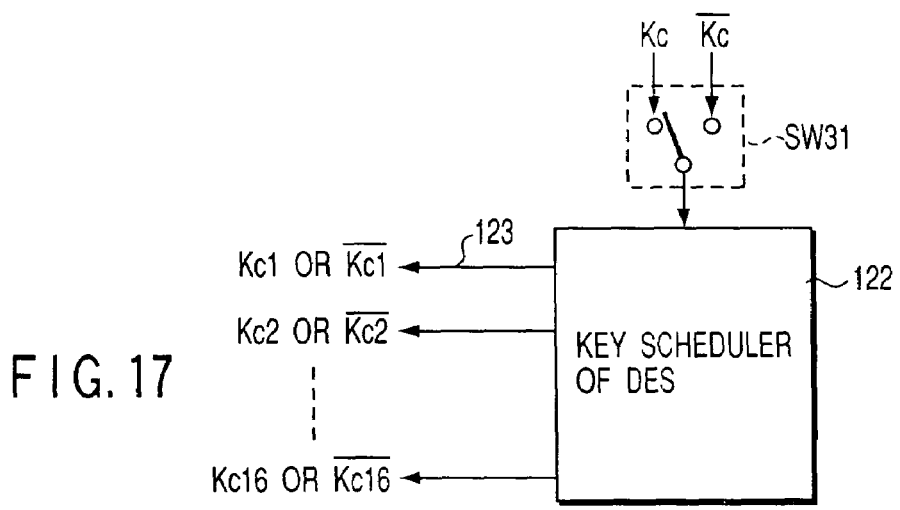
FIG. 17 is a block diagram showing an arrangement in which a mask is added to the key scheduler according to the present invention.

FIG. 17 shows the flow of processing in a case wherein the present invention is applied to the key scheduler.

On the key input round of the key scheduler, Kc and $K\bar{c}$ are randomly selected by a switch SW31 with a probability of almost ½ and input to a key scheduler 122. The subsequent processing in the key scheduler is the same as key schedule processing in the general DES. An extended key 123 to be output is Kci when the input key is Kc, and $K\bar{c}i$ when the input key is Kci.

Figure 18:
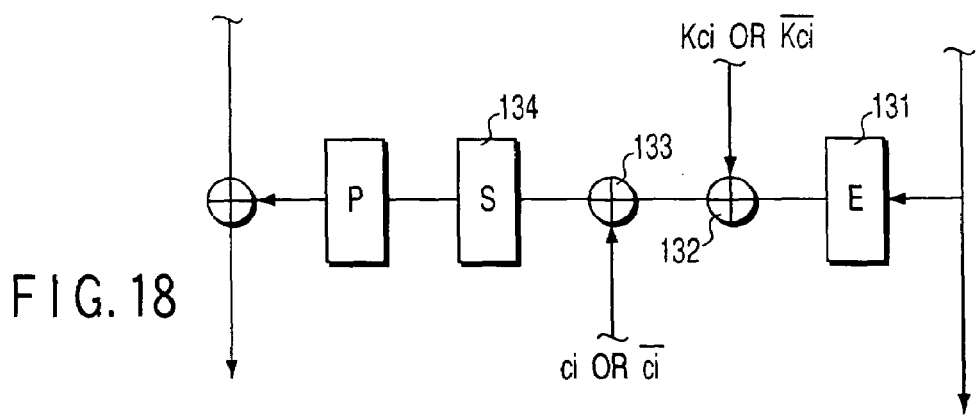
FIG. 18 is a block diagram showing an arrangement in which the mask added to the key scheduler is added to each round function according to the present invention.

FIG. 18 shows how an extended key influenced by a mask is applied to a message in each round function.

A method of applying Kci or $K\bar{c}i$ to a message is generally the same as the method of applying Ki to a message. An exclusive OR 132 applies the extended key Kci or $K\bar{c}i$ to the 48 bits output from an expansion E 131 in units of bits by exclusive OR operation. Since the resultant data is influenced by the mask $\underline{c}$ or $\bar{c}$, if this data is input to an S-box without any change, correct encryption cannot be performed. For this reason, the influence of the mask $\underline{c}$ or $\bar{c}$ on the data must be removed before it is input to the S-box. More specifically, if the influence of the mask is represented by ci, ci is applied to the data by an exclusive OR 133 before the data is input to an S-box 134. Since inversion of an exclusive OR is an exclusive OR, the influence of ci can be removed. This applies to a case wherein the influence of the masks is represented by $\bar{c}i$.

In this embodiment, if the mask $\bar{c}$ is selected as bit translation of the mask $\underline{c}$, the respective bits of the extended key uniformly take the values "1" and "0". This can prevent leakage of information about the key against various types of observation from outside the encryption apparatus. To minimize leakage of information, ci and $\bar{c}i$ preferably have similar Hamming weights. Note, however, that ci is obtained by processing $\underline{c}$ through a key schedule. It is therefore difficult to completely control the Hamming weights of ci on all the rounds. Under the circumstances, a method of selecting a mask having a Hamming weight corresponding to ½ the bit size as the original mask $\underline{c}$ may be used.

Figure 19:
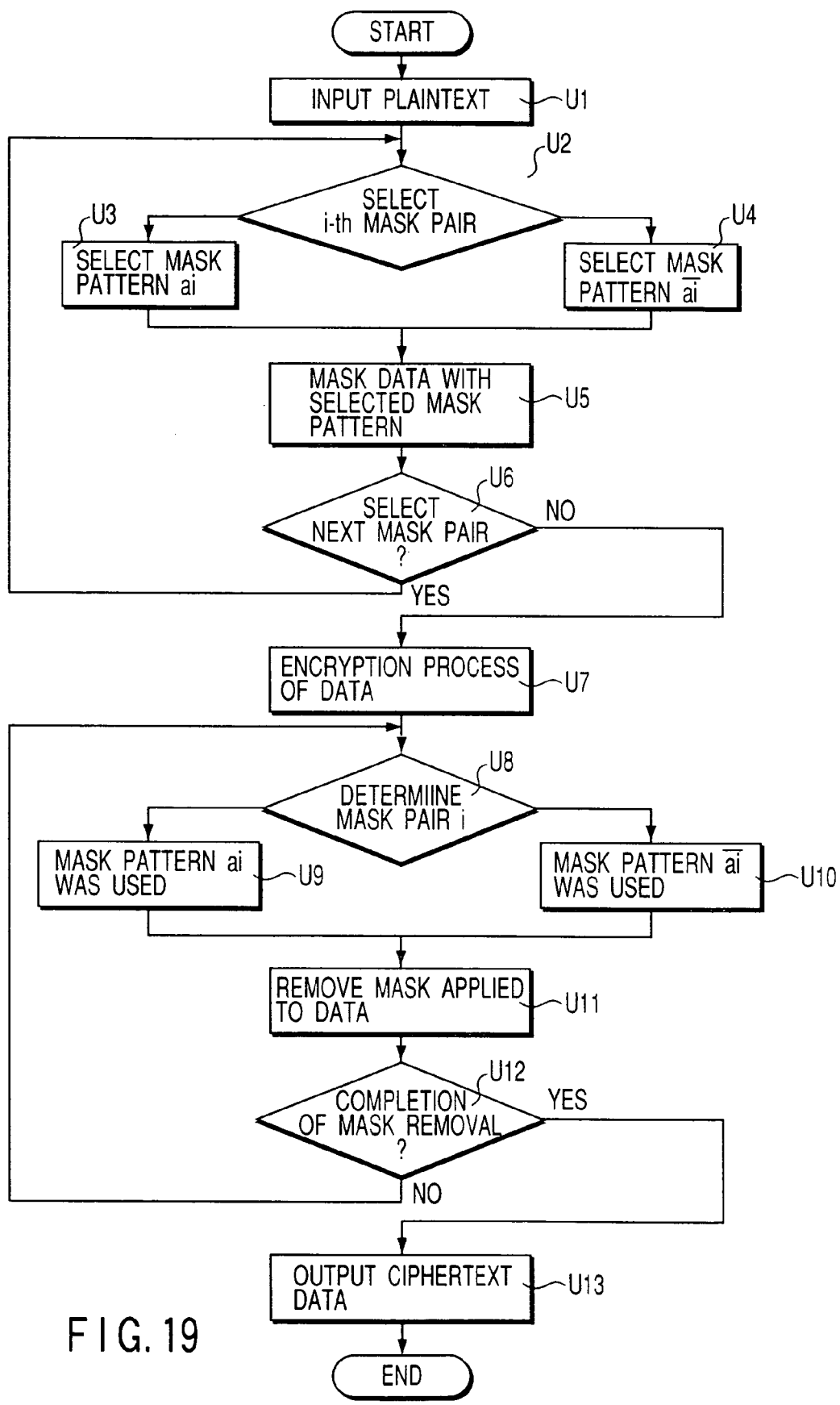
FIG. 19 is a flow chart showing the flow of processing in an encryption method according to an embodiment, which includes the step of masking bits dependent on a plaintext with selected mask patterns and the step of removing the influence of the masks described above from the ciphertext before it is output.

FIG. 19 is a flow chart showing the flow of processing in an encryption method according to an embodiment, which includes the step of masking bits dependent on a plaintext with selected mask patterns and the step of removing the influence of the masks described above from the ciphertext before it is output.

When plaintext data is input (step U1), at least one i-th mask pair is selected (step U2). With this operation, mask patterns ai (step U3) or inverted mask patterns $\bar{a}$ of the mask patterns ai are selected. The data is masked with the selected masks (step U5). It is checked whether the next mask pair is selected (step U6). If the selection of the next masks are required, the processing is repeated from the step of selecting the new i-th mask pair (step U2). If the selection of the required mask pair is complete, an encryption process of the data is performed (step U7).

Since the intermediate output data obtained by the encryption process (step U7) has been masked with the mask patterns, the i-th mask pair is determined first (step U8) to determine whether the mask patterns ai were used (step U9) or the inverted mask patterns $\bar{a}$ were used (step U10). The masks applied to the data are removed (step U11). It is then checked whether mask removal is complete (step U12). If masks are left, the processing is repeated from the step of determining the new mask pair (step 8). If mask removal is completed by the above steps, the ciphertext is output (step U13).

Figure 20:
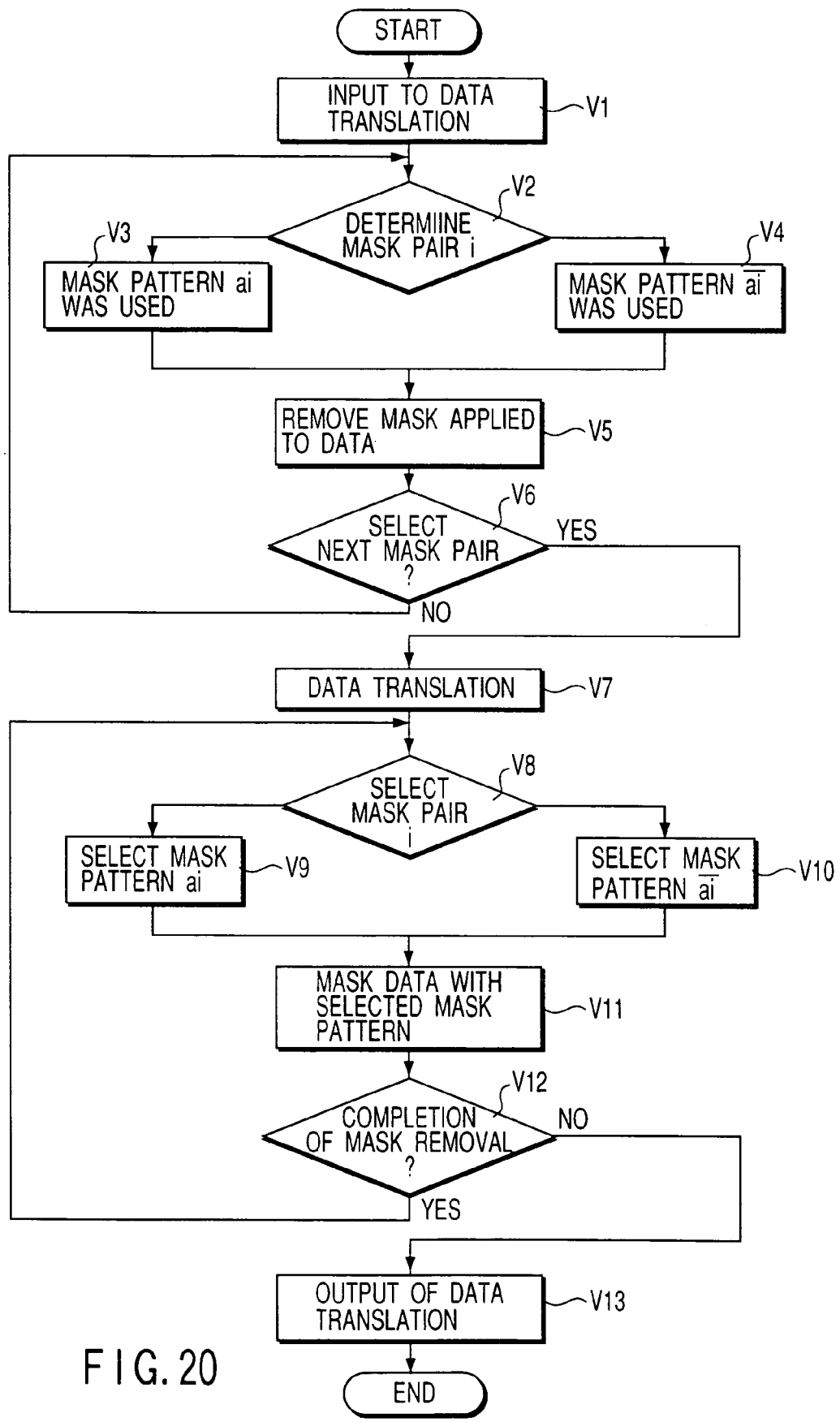
FIG. 20 is a flow chart showing the flow of processing in an encryption method according to an embodiment.

FIG. 20 is a flow chart showing the flow of processing in an encryption method according to an embodiment, which includes the step of removing the influence of masks from input data to a data translation and the step of masking the output data from the data translation with mask patterns.

When data is input to the data translation (step V1), an i-th mask pair is checked (step V2) to determine whether mask patterns ai were used (step V3) or inverted mask patterns $\bar{a}$ of the mask patterns ai were used (step V4). The masks applied to the data are removed (step V5).

It is checked whether mask removal is complete (step V6). If masks are left, the processing is repeated from the step of checking a new mask pair (step V2). If mask removal is completed by the above steps, data translation is performed (step V7).

For the output data upon the above data translation (step V7), at least one i-th mask pair is selected (step V8), and the mask patterns ai (step V9) or mask patterns $\bar{a}$ (step V10) are selected. The data is masked with the selected masks (step V11). It is then checked whether the next mask pair is selected (step V12). If selection of a mask pair that demands selection of the next mask and masking are complete, the data is output from the data translation (step V13).

Figure 21:
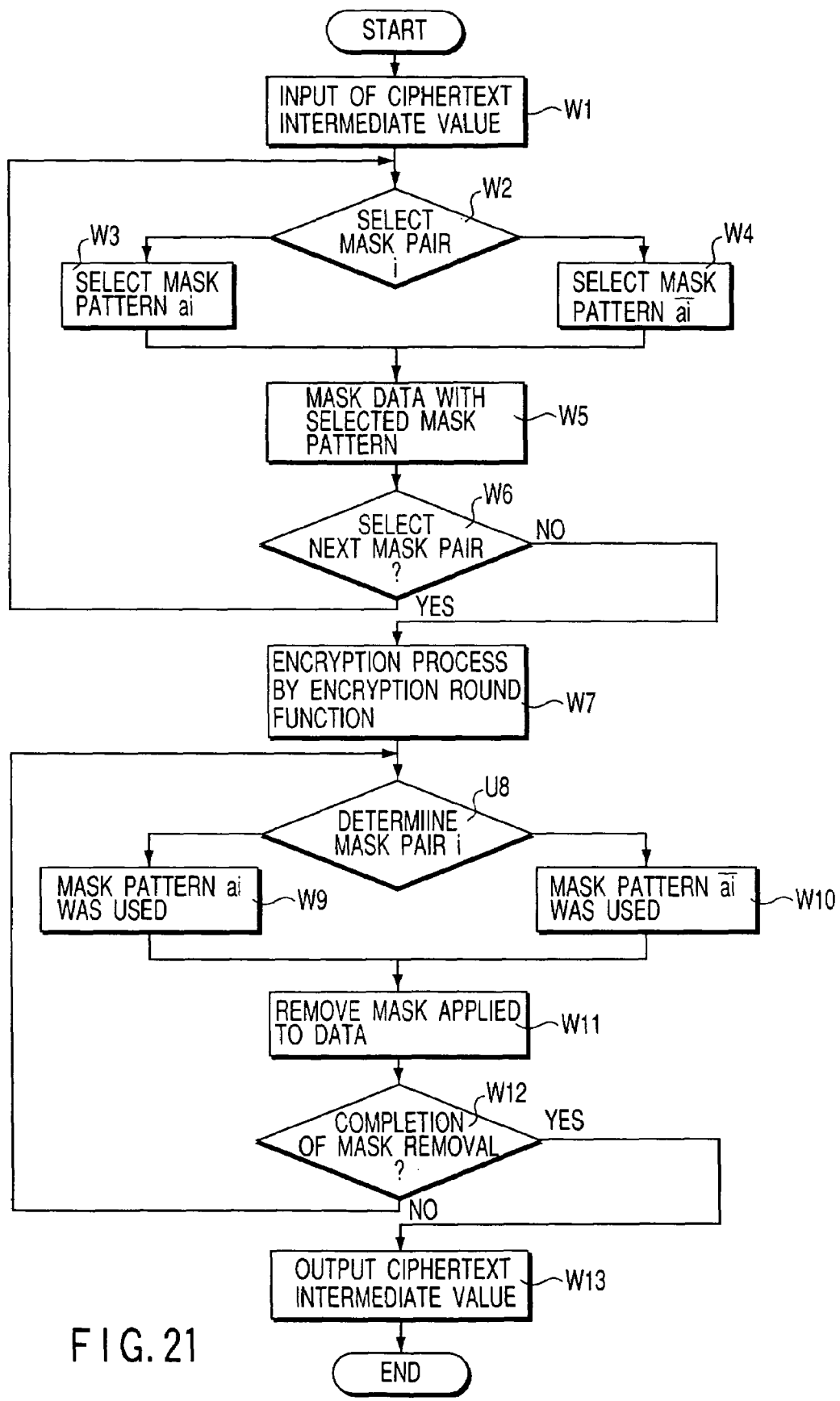
FIG. 21 is a flow chart showing the flow of processing in an encryption method according to an embodiment, which includes the step of removing the influence of masks from intermediate bit data during an encryption procedure and the step of masking the data with mask patterns.

FIG. 21 is a flow chart showing the flow of processing in an encryption method according to an embodiment, which includes the step of removing the influence of masks from intermediate bit data during an encryption procedure and the step of masking the data with mask patterns.

When ciphertext intermediate value as intermediate encryption bit data is input (step W1), an i-th mask pair is checked (step W2) to determine whether mask patterns ai were used (step W3) or inverted mask patterns $\bar{a}$ of the mask patterns ai were used (step W4). The masks applied to the data are removed (step W5).

It is then checked whether mask removal is complete (step W6). If masks are left, the processing is repeated from the step of checking a new mask pair (step W2). When mask removal is completed by the above steps, an encryption process is performed by an expansion E round function (step W7).

For the output data from the encryption round function (step 7W), at least one i-th mask pair is selected to select the mask patterns ai (step W9) or the inverted mask patterns $\bar{a}$ (step W10). The data is masked with the selected mask pair (step W11). It is further checked whether the next mask pair is selected (step W12). If selection of a mask pair that demands selection of the next mask and masking are complete, the ciphertext intermediate value is output (step W13).

Figure 22:
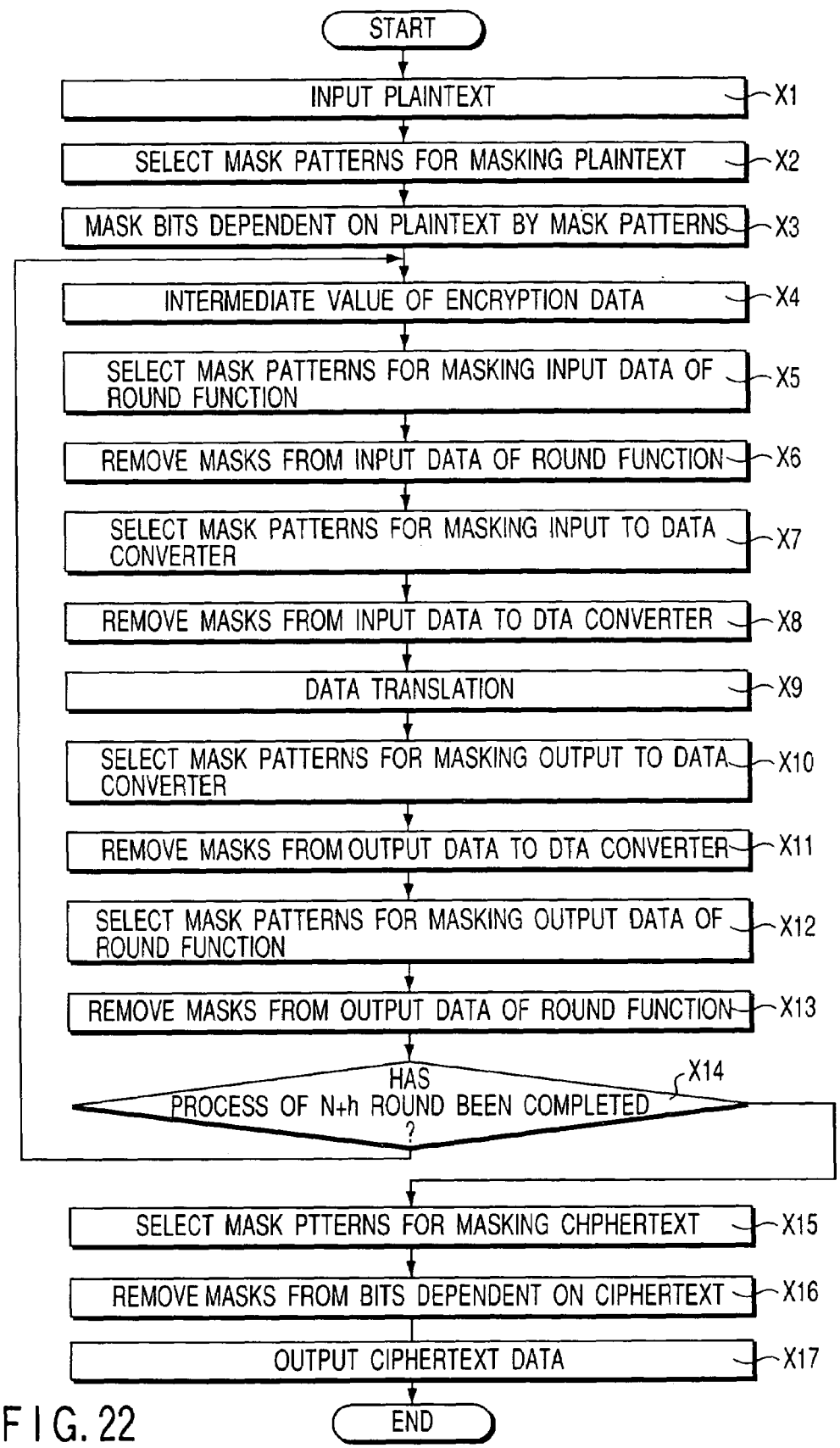
FIG. 22 is a flow chart associated with an encryption procedure according to an embodiment of the present invention.

FIG. 22 is a flow chart associated with an encryption procedure according to an embodiment of the present invention. When a plaintext is input (step X1), mask patterns for masking the plaintext is selected (step X2). Bits dependent on the plaintext are masked with the selected mask patterns (step X3).

For an intermediate value of the encryption data having undergone the above masking process (step X4), mask patterns for masking the input data of a round function is selected (step X5). The masks are removed from the input data of the round function (step X6). Mask patterns for masking an input to the data translation are selected (step X7). The masks are removed from the input data to the data translation (step X8). The data translation then converts the input data (step X9).

Mask patterns for masking the output from the data translation (step X9) are selected (step X10), and the output data from the data translation is masked with the mask patterns (step X11). Mask patterns for masking the output data of the round function are selected (step X12), and the output data of the round function is masked with the mask patterns (step X13).

It is checked whether the above procedure is complete up to the nth round (step X14). If the processing is not complete, the processing is repeated from step X4. If the processing is complete up to the nth round, mask patterns that mask the ciphertext are selected (step X15), and the masks are removed from the bits dependent on the ciphertext (step X16). The finally obtained ciphertext is output (step X17).

AS the processing in steps X2, X3, X15, and X16, the processing described with reference to FIG. 19 is performed. As the processing in steps X5, X6, X12, and X13, the processing described with reference to FIG. 20 is performed. As the processing from step S7 to step X11, mask determination processing, mask removal, and concealment processing using masks are performed in one process by using tables calculated in advance and the like to prevent leakage of intermediate data in process.

FIG. 23 is a block diagram showing the arrangement of an IC card that implements the encryption/decryption apparatus, encryption/decryption method, and program storage medium therefor according to the present invention described above. As shown in FIG. 23, an IC card 201 includes a CPU 203, RAM 205, ROM 207, EEPROM 209, and contactor 211. The RAM 205 is used to store various data and as a work area or the like. The ROM 207 is used to store various data, programs, and the like. The EEPROM 209 is used to store the programs indicated by the flow charts of FIGS. 19 to 22 and the like. The contactor 211 obtains electrical contact with an IC card reader/writer (not shown). Note that the programs shown in FIGS. 19 to 22 may be stored in the RAM 205 or ROM 207 instead of the EEPROM 209.

In the above embodiment, the application of the present invention to the DES scheme has been described in detail. However, the present invention is not limited to this and can be applied to general encryption schemes comprised of part or all of the following three types of functions, namely dyadic operation like exclusive OR operation, a permutation equivalent to bit interchange, and cipher system equivalent an S-box.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encryption apparatus for converting a plaintext block into a ciphertext block depending on supplied key information, comprising:

means for randomly selecting one pattern of each of pairs ai, $\overline{ai}$ (where $i$ is a positive integer not less than one) of one or a plurality of predetermined mask patterns and mask patterns obtained by bit inversion of the predetermined mask patterns every time encryption is performed;

means for masking bits of the plaintext block within said encryption apparatus with the mask patterns selected by said selection means; and means for removing an influence of the selected mask patterns from the ciphertext block before the ciphertext block is output from said encryption apparatus.

2. An apparatus according to claim 1, wherein said means for masking the bits dependent on the plaintext within said encryption apparatus with the selected mask patterns and said means for removing the influence of the selected mask patterns from the ciphertext block comprise one of: exclusive OR, addition or subtraction with respect to a modulus, and multiplication or division with respect to the modulus.

3. An apparatus according to claim 1, wherein the pair ai, $\overline{ai}$ of the mask patterns and the mask patterns obtained by bit inversion comprises a pair a, $\overline{\alpha}$ of predetermined fixed mask patterns and mask patterns obtained by bit inversion of the fixed mask patterns.

4. An apparatus according to claim 1, wherein the pair ai, $\overline{ai}$ of the mask patterns and the mask patterns obtained by bit inversion are not necessarily concealed.

5. An apparatus according to claim 1, wherein a Hamming weight indicating the number of bits "1s" of an n-bit long bit sequence $x$ is defined as H(x), and the Hamming weight H(a) of each of the selected mask patterns satisfies 0<H(a)<n.

6. An apparatus according to claim 1, wherein a Hamming weight indicating the number of bits "1s" of an n-bit long bit sequence $x$ is defined as H(x), and an absolute value of a difference between the Hamming weight H(a) of each of the selected mask patterns and a Hamming weight H ($\overline{\alpha}$) of bit inversion $\overline{\alpha}$ of each of the selected mask patterns is less than n/2.

7. An encryption apparatus for converting a plaintext block into a ciphertext block depending on supplied key information, comprising:

means for randomly selecting one pattern of each of pairs ai, $\overline{ai}$ (where $i$ is a positive integer not less than one) of one or a plurality of predetermined mask patterns and mask patterns obtained by bit inversion of the predetermined mask patterns every time encryption is performed;

means for masking intermediate bit data within said encryption apparatus with the mask patterns selected by said selection means; and means for removing an influence of the selected mask patterns from the intermediate bit data masked by said masking means before the ciphertext block is output from said encryption apparatus.

8. An apparatus according to claim 7, wherein said means for masking intermediate bit data within said encryption apparatus with the selected mask patterns and said means for removing the influence of the selected mask patterns from the masked intermediate bit data comprise one of: exclusive OR, addition or subtraction with respect to a modulus, and multiplication or division with respect to the modulus.

9. An encryption apparatus for converting a plaintext block into a ciphertext block depending on supplied key information, comprising:

data translation means for performing data translation to intermediate data within said apparatus;

means for randomly selecting one pattern of each of pairs ai, $\overline{ai}$ (where $i$ is a positive integer not less than one) of one or a plurality of predetermined mask patterns and mask patterns obtained by bit inversion of the predetermined mask patterns every time encryption is performed;

means for masking an input to said data translation means with the mask patterns selected by said selection means;

means for removing an influence of the selected mask patterns from an output from said data translation means, which is masked by said masking means, before the ciphertext block is output from said encryption apparatus.

10. An apparatus according to claim 9, wherein said data translation means, said means for masking the input to said data translation means with the selected mask patterns, and said means for removing the influence of the selected mask patterns from the masked output from said data translation means comprise one of: exclusive OR, addition or subtraction with respect to a modulus, and multiplication or division with respect to the modulus.

11. An apparatus according to claim 9, further comprising:

first storage means for storing, in the form of a table, said means for randomly selecting one pattern of each of the pairs ai, $\overline{ai}$ (where $i$ is a positive integer not less than one) of one or the plurality of predetermined mask patterns and the mask patterns obtained by bit inversion of the predetermined mask patterns every time encryption is performed, said means for masking the input to said data translation means with the mask patterns ai, and said means for removing the influence of the masks ai from the masked output from said data translation means;

second storage means for storing, in the form of a table, said means for masking the input to said data translation means with mask patterns $\overline{\alpha}$, and said means for removing an influence of the masks $\overline{\alpha}$ from the masked output from said data translation means; and masked data translation means for randomly selecting one of said first and second storage means every time encryption is performed, and performing the processing by said data translation means for masked data.

12. A decryption apparatus for converting a ciphertext block into a plaintext block depending on supplied key information, comprising:

means for randomly selecting one pattern of each of pairs ai, $\overline{ai}$ (where $i$ is a positive integer not less than one) of one or a plurality of predetermined mask patterns and mask patterns obtained by bit inversion of the predetermined mask patterns every time decryption is performed;

means for masking bits of the ciphertext block within said decryption apparatus with the mask patterns selected by said selection means; and means for removing an influence of the selected mask patterns from the plaintext block before the plaintext block is output from said decryption apparatus.

13. An apparatus according to claim 12, wherein said means for masking bits of the ciphertext block within said decryption apparatus with the selected mask patterns and said means for removing the influence of the selected mask patterns from the ciphertext block comprise one of: exclusive OR, addition or subtraction with respect to a modulus, and multiplication or division with respect to the modulus.

14. An apparatus according to claim 12, wherein the pair ai, $\overline{ai}$ of the mask patterns and the mask patterns obtained by bit inversion comprises a pair a, $\overline{\alpha}$ of predetermined fixed mask patterns and mask patterns obtained by bit inversion of the fixed mask patterns.

15. An apparatus according to claim 12, wherein a Hamming weight indicating the number of bits "1s" of an n-bit long bit sequence x is defined as H(x), and the Hamming weight H(a) of each of the selected mask patterns satisfies 0<H(a)<n.

16. An apparatus according to claim 12, wherein a Hamming weight indicating the number of bits "1s" of an n-bit long bit sequence x is defined as H(x), and an absolute value of a difference between the Hamming weight H(a) of each of the selected mask patterns and a Hamming weight H($\overline{\alpha}$) of bit inversion $\overline{\alpha}$ of each of the selected mask patterns is less than n/2.

17. A decryption apparatus for converting a ciphertext block into a plaintext block depending on supplied key information, comprising:

means for randomly selecting one pattern of each of pairs ai, $\overline{ai}$ (where i is a positive integer not less than one) of one or a plurality of predetermined mask patterns and mask patterns obtained by bit inversion of the predetermined mask patterns every time decryption is performed;

means for masking intermediate bit data within said decryption apparatus with the mask patterns selected by said selection means; and means for removing an influence of the selected mask patterns from the intermediate bit data masked by said masking means before the plaintext block is output from said decryption apparatus.

18. An apparatus according to claim 17, wherein said means for masking intermediate bit data within said decryption apparatus with the selected mask patterns and said means for removing the influence of the selected mask patterns from the masked intermediate bit data comprise one of: exclusive OR, addition or subtraction with respect to a modulus w, and multiplication or division with respect to the modulus w.

19. An apparatus according to claim 17, wherein the pair ai, $\overline{ai}$ of the mask patterns and the mask patterns obtained by bit inversion are not necessarily concealed.

20. A decryption apparatus for converting a ciphertext block into a plaintext block depending on supplied key information, comprising:

data translation means for performing data translation to intermediate data within said apparatus;

means for randomly selecting one pattern of each of pairs ai, $\overline{ai}$ (where i is a positive integer not less than one) of one or a plurality of predetermined mask patterns and mask patterns obtained by bit inversion of the predetermined mask patterns every time decryption is performed;

means for masking an input to said data translation means with the mask patterns selected by said selection means; and means for removing an influence of the selected mask patterns from an output from said data translation means, which is masked by said masking means, before the plaintext block is output from said decryption apparatus.

21. An apparatus according to claim 20, further comprising:

first storage means for storing, in the form of a table, said means for randomly selecting one pattern of each of the pairs ai, $\overline{ai}$ (where i is a positive integer not less than one) of one or the plurality of predetermined mask patterns and the mask patterns obtained by bit inversion of the predetermined mask patterns every time decryption is performed, said means for masking the input to said data translation means with the mask patterns ai, and means for removing the influence of the masks ai from the masked output from said data translation means;

second storage means for storing, in the form of a table, means for masking the input to said data translation means with mask patterns $\overline{\alpha}$, and means for removing an influence of the masks $\overline{\alpha}$ from the masked output from said data translation means; and masked data translation means for randomly selecting one of said first and second storage means every time decryption is performed, and performing the processing by said data translation means for masked data.

22. An encryption method of converting a plaintext block into a ciphertext block depending on supplied key information, using an encryption apparatus, the method comprising the steps of:

randomly selecting one pattern of each of pairs ai, $\overline{ai}$ (where i is a positive integer not less than one) of one or a plurality of predetermined mask patterns and mask patterns obtained by bit inversion of the predetermined mask patterns every time encryption is performed;

masking bits of the plaintext block within the encryption apparatus with the selected mask patterns; and removing an influence of the selected mask patterns from the ciphertext block before the ciphertext block is output from said encryption apparatus.

23. A method according to claim 22, wherein the step of masking the bits dependent on the plaintext within the method with the selected mask patterns and the step of removing the influence of the selected mask patterns from the ciphertext comprise one of: exclusive OR, addition or subtraction with respect to a modulus, and multiplication or division with respect to the modulus.

24. A method according to claim 22, wherein the pair ai, $\overline{ai}$ of the mask patterns and the mask patterns obtained by bit inversion comprises a pair a, $\overline{\alpha}$ of predetermined fixed mask patterns and mask patterns obtained by bit inversion of the fixed mask patterns.

25. A method according to claim 22, wherein the pair a, $\overline{\alpha}$ of the mask patterns and the mask patterns obtained by bit inversion are not necessarily concealed.

26. A method according to claim 22, wherein a Hamming weight indicating the number of bits "1" of an n-bit long bit sequence x is defined as H(x), and the Hamming weight H(a) of each of the selected mask patterns satisfies 0<H(a)<n.

27. A method according to claim 22, wherein a Hamming weight indicating the number of bits "1s" of an n-bit long bit sequence x is defined as H(x), and an absolute value of a difference between the Hamming weight H(a) of each of the selected mask patterns and a Hamming weight H($\overline{\alpha}$) of bit inversion a of each of the selected mask patterns is less than n/2.

28. An encryption method of converting a plaintext block into a ciphertext block depending on supplied key information, using an encryption apparatus, the method comprising the steps of:

randomly selecting one pattern of each of pairs ai, $\overline{ai}$ (where i is a positive integer not less than one) of one or a plurality of predetermined mask patterns and mask patterns obtained by bit inversion of the predetermined mask patterns every time encryption is performed;

masking intermediate bit data within the encryption apparatus with the selected mask patterns; and removing an influence of the selected mask patterns from the masked intermediate bit data before the ciphertext block is output from said encryption apparatus.

29. A method according to claim 28, wherein the step of masking intermediate bit data within the encryption apparatus with the selected mask patterns and the step of removing the influence of the selected mask patterns from the masked intermediate bit data comprise one of: exclusive OR, addition or subtraction with respect to a modulus, and multiplication or division with respect to the modulus.

30. An encryption method of converting a plaintext block into a ciphertext block depending on supplied key information, using an encryption apparatus, the method comprising the steps of:

performing data translation to intermediate data within the method;

randomly selecting one pattern of each of pairs ai, $\underline{ai}$ (where i is a positive integer not less than one) of one or a plurality of predetermined mask patterns and mask patterns obtained by bit inversion of the predetermined mask patterns every time encryption is performed;

masking an input to the data translation step with the selected mask patterns; and removing an influence of the selected mask patterns from a masked output from the data translation step before the ciphertext block is output from said encryption apparatus.

31. A method according to claim 30, wherein the data translation step, the step of masking the input to the data translation step with the selected mask patterns, and the step of removing the influence of the selected mask patterns from the masked output from the data translation step comprise one of: exclusive OR, addition or subtraction with respect to a modulus, and multiplication or division with respect to the modulus.

32. A method according to claim 30, further comprising the steps of:

storing, in the form of a table, the step of randomly selecting one pattern of each of the pairs ai, $\overline{ai}$ (where i is a positive integer not less than one) of one or the plurality of predetermined mask patterns and the mask patterns obtained by bit inversion of the predetermined mask patterns every time encryption is performed, the step of masking the input to said data translation step with the selected mask patterns and the step of removing the influence of the selected mask patterns from the masked output from the data translation step;

storing, in the form of a table, the step of masking the input to said data translation step with the selected mask patterns and the step of removing an influence of the selected mask patterns from the masked output from the data translation step; and randomly selecting one of the first and second storage steps every time encryption is performed, and performing the processing in the data translation step for masked data.

33. A decryption method of converting a ciphertext block into a plaintext block depending on supplied key information, using a decryption apparatus, the method comprising the steps of:

randomly selecting one pattern of each of pairs ai, $\overline{ai}$ (where i is a positive integer not less than one) of one or a plurality of predetermined mask patterns and mask patterns obtained by bit inversion of the predetermined mask patterns every time decryption is performed;

masking bits of the ciphertext block within the decryption apparatus with the selected mask patterns; and removing an influence of the selected mask patterns from the plaintext block before the plaintext block is output from the decryption apparatus.

34. A method according to claim 33, wherein the step of masking bits of the ciphertext block within the decryption apparatus with the selected mask patterns and the step of removing the influence of the selected mask patterns from the block plaintext comprise one of: exclusive OR, addition or subtraction with respect to a modulus $\underline{w}$, and multiplication or division with respect to the modulus $\overline{w}$.

35. A method according to claim 33, wherein the pair ai, $\overline{ai}$ of the mask patterns and the mask patterns obtained by bit inversion comprises a pair a, $\overline{a}$ of predetermined fixed mask patterns and mask patterns obtained by bit inversion of the fixed mask patterns.

36. A method according to claim 33, wherein the pair ai, $\overline{ai}$ of the mask patterns and the mask patterns obtained by bit inversion are not necessarily concealed.

37. A method according to claim 33, wherein a Hamming weight indicating the number of "1" bits of an n-bit long bit sequence $\underline{x}$ is defined as H(x), and the Hamming weight H(a) of each of the selected mask patterns satisfies 0<H(a)<n.

38. A method according to claim 33, wherein a Hamming weight indicating the number of "1" bits of an n-bit long bit sequence $\underline{x}$ is defined as H(x), and an absolute value of a difference between the Hamming weight H(a) of each of the selected mask patterns and a Hamming weight H($\overline{a}$) of bit inversion $\overline{a}$ of the each of the selected mask patterns is less than n/2.

39. A decryption method of converting a ciphertext block into a plaintext block depending on supplied key information, using a decryption apparatus, the method comprising the steps of:

randomly selecting one pattern of each of pairs ai, $\overline{ai}$ (where i is a positive integer not less than one) of one or a plurality of predetermined mask patterns and mask patterns obtained by bit inversion of the predetermined mask patterns every time decryption is performed;

masking intermediate bit data within the decryption apparatus with the selected mask patterns; and removing an influence of the selected mask patterns from the masked intermediate bit data before the plaintext block is output from said decryption apparatus.

40. A method according to claim 39, wherein the step of masking intermediate bit data within the decryption apparatus with the selected mask patterns and the step of removing the influence of the selected mask patterns from the masked intermediate bit data comprise one: of exclusive OR, addition or subtraction with respect to a modulus, and multiplication or division with respect to the modulus.

41. A decryption method of converting a ciphertext block into a plaintext block depending on supplied key information, using a decryption apparatus, the method comprising the steps of:

performing data translation to intermediate data within the method;

randomly selecting one pattern of each of pairs ai, $\overline{ai}$ (where i is a positive integer not less than one) of one or a plurality of predetermined mask patterns and mask patterns obtained by bit inversion of the predetermined mask patterns every time decryption is performed;

masking an input to the data translation step with the selected mask patterns; and removing an influence of the selected mask patterns from a masked output from the data translation step before the plaintext block is output from the decryption apparatus.

42. A method according to claim 41, wherein the data translation step, the step of masking the input to the data translation step with the selected mask patterns, and the step of removing the influence of the selected mask patterns from the masked output from the data translation step comprise one of an exclusive OR, addition or subtraction with respect to a modulus, and multiplication or division with respect to the modulus.

43. A method according to claim 41, further comprising the steps of:

storing, in the form of a table, the step of randomly selecting one pattern of each of the pairs ai, $\overline{ai}$ (where i is a positive integer not less than one) of one or the plurality of predetermined mask patterns and the mask patterns obtained by bit inversion of the predetermined mask patterns every time decryption is performed, the step of masking the input to said data translation step with the selected mask patterns, and the step of removing the influence of the selected masks patterns from the masked output from the data translation step;

storing, in the form of a table, the step of masking the input to said data translation step with the selected mask patterns, and the step of removing an influence of the selected mask pattern from the masked output from the data translation step; and randomly selecting one of the first and second storage steps every time decryption is performed, and performing the processing in the data translation step for masked data.

44. A computer-usable program storage medium storing computer-readable program code means for converting a plaintext block into a ciphertext block depending on supplied key information, using an encryption apparatus, comprising:

computer-readable program code means for causing a computer to randomly select one pattern of each of pairs ai, $\overline{ai}$ (where i is a positive integer not less than one) of one or a plurality of predetermined mask patterns and mask patterns obtained by bit inversion of the predetermined mask patterns every time encryption is performed;

computer-readable program code means for causing said computer to mask bits of the plaintext block within the encryption apparatus with the selected mask patterns; and computer-readable program code means for causing said computer to remove an influence of the selected mask patterns from the ciphertext block before the ciphertext block is output from said encryption apparatus.

45. An encryption apparatus for converting a plaintext block into a ciphertext block depending on supplied key information, comprising:

means for randomly selecting one pattern of each of pairs ai, $\overline{ai}$ (where i is a positive integer not less than one) of one or a plurality of predetermined mask patterns and mask patterns obtained by bit inversion of the predetermined mask patterns every time encryption is performed;

means for masking bits of the plaintext block dependent on a key within said encryption apparatus with the mask patterns selected by said selection means;

data translation means for converting intermediate data within said apparatus with the key; and means for removing an influence of the selected mask patterns from an output from said data translation means before the ciphertext block is output from said encryption apparatus.

46. An apparatus according to claim 45, wherein the pair ai, $\overline{ai}$ of the mask patterns and the mask patterns obtained by bit inversion comprises a pair a, $\overline{\alpha}$ of predetermined fixed mask patterns and mask patterns obtained by bit inversion of the fixed mask patterns.

47. An apparatus according to claim 45, wherein the pair ai, $\overline{ai}$ of the mask patterns and the mask patterns obtained by bit inversion are not necessarily concealed.

48. An apparatus according to claim 45, wherein a Hamming weight indicating the number of bits "1s" of an n-bit long bit sequence $\underline{x}$ is defined as H(x), and the Hamming weight H(a) of each of the selected mask patterns satisfies 0<H(a)<n.

49. An apparatus according to claim 45, wherein a Hamming weight indicating the number of bits "1s" of an n-bit long bit sequence $\underline{x}$ is defined as H(x), and an absolute value of a difference between the Hamming weight H(a) of each of the selected mask patterns and a Hamming weight H($\overline{\alpha}$) of bit inversion $\overline{\alpha}$ of each of the selected mask patterns is less than n/2.

* * * * *

UNITED STATES PATENT AND TRADEMARK OFFICE
CERTIFICATE OF CORRECTION

PATENT NO. : 6,940,975 B1
DATED : September 6, 2005
INVENTOR(S) : Kawamura et al.

It is certified that error appears in the above-identified patent and that said Letters Patent is hereby corrected as shown below:

Column 21,
Line 24, change "$\underline{ai}$" to -- $\overline{ai}$ --.

Signed and Sealed this

Twentieth Day of December, 2005

JON W. DUDAS
*Director of the United States Patent and Trademark Office*